United States Patent
Engeström et al.

(10) Patent No.: US 7,407,107 B2
(45) Date of Patent: Aug. 5, 2008

(54) APPARATUS, SYSTEM, METHOD AND COMPUTER PROGRAM PRODUCT FOR CREATING SHORTCUTS TO FUNCTIONS IN A PERSONAL COMMUNICATION DEVICE

(75) Inventors: Jyri Engeström, Helsinki (FI); Marko Ahtisaari, Espoo (FI); Jyrki Hoisko, Oulu (FI)

(73) Assignee: Nokia Corporation, Espoo (FI)

( * ) Notice: Subject to any disclaimer, the term of this patent is extended or adjusted under 35 U.S.C. 154(b) by 882 days.

(21) Appl. No.: 10/728,915

(22) Filed: Dec. 8, 2003

(65) Prior Publication Data

US 2005/0125745 A1    Jun. 9, 2005

(51) Int. Cl.
*G06K 19/06* (2006.01)
(52) U.S. Cl. .............................. 235/472.01; 235/472.02
(58) Field of Classification Search ............ 235/472.01, 235/472.02, 472.03
See application file for complete search history.

(56) References Cited

U.S. PATENT DOCUMENTS

| | | | |
|---|---|---|---|
| 3,916,160 A | 10/1975 | Russo et al. | |
| 3,971,917 A | 7/1976 | Maddox et al. | |
| 4,692,603 A | 9/1987 | Brass et al. | |
| 4,728,783 A | 3/1988 | Brass et al. | |
| 4,745,269 A | 5/1988 | Van Gils | |
| 4,754,127 A | 6/1988 | Brass et al. | |
| 4,782,221 A | 11/1988 | Brass et al. | |
| 4,794,239 A | 12/1988 | Allais | |
| 4,874,936 A | 10/1989 | Chandler et al. | |
| 4,896,029 A | 1/1990 | Chandler et al. | |
| 4,924,078 A | 5/1990 | Sant'Anselmo et al. | |
| 4,939,354 A | 7/1990 | Priddy et al. | |

(Continued)

FOREIGN PATENT DOCUMENTS

| | | |
|---|---|---|
| DE | 10042914 | 4/2001 |
| EP | 0801512 | 10/1997 |
| EP | 0 853 287 A2 | 7/1998 |

(Continued)

OTHER PUBLICATIONS

Aim White Paper: "Introduction to Radio Frequency Identification (RFID)—A Basic Primer", The Association of the Automatic Identification and Data Capture Industry, [Online] Aug. 23, 2001, pp. 1-17; http://www.aimglobal.org/technologies/rfid/resources/RFIDPrimer.pdf>.

"CodeXML Router—Bluetooth Edition", http//www.gocode.com/products/coderouter.htm, 2 pages, printed on Jul. 2, 2004.

"CodeXML Bluetooth Modem", product sheets (2 pp), printed from www.gocode.com on Jul. 2, 2004.

(Continued)

*Primary Examiner*—Karl D. Frech
(74) *Attorney, Agent, or Firm*—Morgan & Finnegan LLP

(57) ABSTRACT

An apparatus, system method, and computer program product for creating shortcuts to functions of a personal communication device that includes the use of an RF tag reader in personal communication device and RF tags placed different locations pertinent to a user. Upon receipt of the RF information, the personal communication device executes a preset shortcut stored in a memory, and prompts a user to select or create a new shortcut. The memory location for storing a shortcut can be the memory in the personal communication device, the memory in an RF tag or the memory in a network server. The shortcut includes at least a RF tag ID; a description of a command, macro or script and information defining the format and properties of the shortcut. Upon execution of the shortcut, and application program is selected for controlling a function of the personal communication device.

77 Claims, 15 Drawing Sheets

U.S. PATENT DOCUMENTS

| | | | |
|---|---|---|---|
| 4,958,064 A | 9/1990 | Kirkpatrick | |
| 4,972,475 A | 11/1990 | Sant'Anselmo | |
| 4,998,010 A | 3/1991 | Chandler et al. | |
| 5,053,609 A | 10/1991 | Priddy et al. | |
| 5,118,369 A | 6/1992 | Shamir | |
| 5,124,536 A | 6/1992 | Priddy et al. | |
| 5,153,148 A | 10/1992 | Sakiyama et al. | |
| 5,189,292 A | 2/1993 | Batterman et al. | |
| 5,206,490 A | 4/1993 | Petigrew et al. | |
| 5,223,701 A | 6/1993 | Batterman et al. | |
| 5,243,655 A | 9/1993 | Wang | |
| 5,250,789 A | 10/1993 | Johnsen | |
| 5,331,176 A | 7/1994 | Sant'Anselmo et al. | |
| 5,369,261 A | 11/1994 | Shamir | |
| 5,378,883 A | 1/1995 | Baterman et al. | |
| 5,412,193 A | 5/1995 | Swartz et al. | |
| 5,415,167 A | 5/1995 | Wilk | |
| 5,449,895 A | 9/1995 | Hecht et al. | |
| 5,478,989 A | 12/1995 | Shepley | |
| 5,493,692 A | 2/1996 | Theimer et al. | |
| 5,508,695 A | 4/1996 | Nelson et al. | |
| 5,512,739 A | 4/1996 | Chandler et al. | |
| 5,521,372 A | 5/1996 | Hecht et al. | |
| 5,550,535 A | 8/1996 | Park | |
| 5,559,707 A | 9/1996 | DeLorme et al. | |
| 5,561,702 A | 10/1996 | Lipp et al. | |
| 5,561,705 A | 10/1996 | Allard et al. | |
| 5,572,653 A | 11/1996 | DeTemple et al. | |
| 5,581,630 A | 12/1996 | Bonneau | |
| 5,591,956 A | 1/1997 | Longacre, Jr. et al. | |
| 5,592,375 A | 1/1997 | Salmon et al. | |
| 5,612,524 A | 3/1997 | Sant'Anselmo et al. | |
| 5,629,981 A | 5/1997 | Nerlikar | |
| 5,630,068 A | 5/1997 | Vela et al. | |
| 5,642,303 A | 6/1997 | Small et al. | 708/109 |
| 5,649,114 A | 7/1997 | Deaton et al. | |
| 5,649,187 A | 7/1997 | Hornbuckle | 395/610 |
| 5,666,214 A | 9/1997 | MacKinlay et al. | |
| 5,682,142 A | 10/1997 | Loosmore et al. | |
| 5,715,314 A | 2/1998 | Payne et al. | |
| 5,729,697 A | 3/1998 | Schkolnick et al. | |
| 5,732,229 A | 3/1998 | Dickinson | |
| 5,764,736 A | 6/1998 | Shachar et al. | |
| 5,764,739 A | 6/1998 | Patton et al. | |
| 5,794,142 A | 8/1998 | Vanttila | |
| 5,799,091 A | 8/1998 | Lodenius | 380/270 |
| 5,811,776 A | 9/1998 | Liu | |
| 5,821,513 A | 10/1998 | O'Hagan et al. | |
| 5,850,187 A | 12/1998 | Carrender et al. | |
| 5,886,646 A | 3/1999 | Watanabe et al. | |
| 5,929,778 A | 7/1999 | Asama et al. | |
| 5,933,829 A | 8/1999 | Durst et al. | |
| 5,948,040 A | 9/1999 | DeLorme et al. | |
| 5,949,335 A | 9/1999 | Maynard | |
| 5,959,530 A | 9/1999 | Lupien, Jr. et al. | |
| 5,970,469 A | 10/1999 | Scroggie et al. | |
| 5,978,773 A | 11/1999 | Hudetz et al. | |
| 5,979,757 A | 11/1999 | Tracy et al. | 235/383 |
| 6,019,449 A | 2/2000 | Bullock et al. | |
| 6,023,241 A | 2/2000 | Clapper | |
| 6,026,375 A | 2/2000 | Hall et al. | |
| 6,029,064 A | 2/2000 | Farris et al. | |
| 6,039,430 A | 3/2000 | Helterline et al. | |
| 6,055,442 A | 4/2000 | Dietrich | |
| 6,058,304 A | 5/2000 | Callaghan et al. | |
| 6,108,656 A | 8/2000 | Durst et al. | |
| 6,138,009 A | 10/2000 | Birgerson | |
| 6,154,745 A | 11/2000 | Kari et al. | |
| 6,176,427 B1 | 1/2001 | Antognini et al. | |
| 6,177,860 B1 | 1/2001 | Cromer et al. | |
| 6,196,466 B1 | 3/2001 | Schuessler | |
| 6,199,048 B1 | 3/2001 | Hudetz et al. | |
| 6,223,988 B1 | 5/2001 | Batterman et al. | |
| 6,249,226 B1 | 6/2001 | Harrison et al. | |
| 6,259,367 B1 | 7/2001 | Klein | |
| 6,295,506 B1 | 9/2001 | Heinonen et al. | |
| 6,308,203 B1 | 10/2001 | Itabashi et al. | |
| 6,311,058 B1 | 10/2001 | Wecker et al. | |
| 6,312,106 B1 | 11/2001 | Walker | |
| 6,314,457 B1 | 11/2001 | Schena et al. | |
| 6,327,570 B1 | 12/2001 | Stevens | 705/7 |
| 6,332,062 B1 | 12/2001 | Phillips et al. | |
| 6,356,543 B2 | 3/2002 | Hall et al. | 370/352 |
| 6,370,389 B1 | 4/2002 | Isomursu et al. | |
| 6,389,278 B1 | 5/2002 | Singh | |
| 6,397,057 B1 | 5/2002 | Malackowski et al. | |
| 6,401,085 B1 | 6/2002 | Gershman et al. | |
| 6,446,004 B1 | 9/2002 | Cao et al. | |
| 6,446,208 B1 | 9/2002 | Gujar et al. | |
| 6,448,979 B1 | 9/2002 | Schena et al. | |
| 6,456,039 B1 | 9/2002 | Lauper et al. | |
| 6,462,660 B1 | 10/2002 | Cannon et al. | 340/572.1 |
| 6,470,096 B2 | 10/2002 | Davies et al. | |
| 6,491,217 B2 | 12/2002 | Catan | 235/375 |
| 6,494,562 B1 | 12/2002 | Walker et al. | |
| 6,512,919 B2 | 1/2003 | Ogasawara | |
| 6,542,933 B1 | 4/2003 | Durst, Jr. et al. | |
| 6,577,901 B2 | 6/2003 | Thompson | |
| 6,587,684 B1 | 7/2003 | Hsu et al. | |
| 6,611,673 B1 | 8/2003 | Bayley et al. | 455/41 |
| 6,622,017 B1 | 9/2003 | Hoffman | |
| 6,641,051 B1 | 11/2003 | Illowsky et al. | |
| 6,647,269 B2 | 11/2003 | Hendrey et al. | |
| 6,650,761 B1 | 11/2003 | Rodriguez et al. | 382/100 |
| 6,678,425 B1 | 1/2004 | Flores et al. | |
| 6,687,793 B1 | 2/2004 | Thomas et al. | |
| 6,753,883 B2 | 6/2004 | Schena et al. | |
| 6,996,537 B2 | 2/2006 | Minear et al. | |
| 7,135,976 B2 | 11/2006 | Neff et al. | |
| 2001/0011247 A1 | 8/2001 | O'Flaherty et al. | |
| 2001/0018349 A1 | 8/2001 | Kinnunen et al. | |
| 2001/0041566 A1 | 11/2001 | Xanthos et al. | |
| 2002/0039909 A1 | 4/2002 | Rankin | |
| 2002/0086680 A1 | 7/2002 | Hunzinger | 455/456 |
| 2002/0087392 A1 | 7/2002 | Stevens | 705/10 |
| 2002/0087529 A1 | 7/2002 | Dutcher et al. | |
| 2002/0094797 A1 | 7/2002 | Marshall et al. | |
| 2002/0095456 A1 | 7/2002 | Wensheng | |
| 2002/0121544 A1 | 9/2002 | Ito et al. | |
| 2002/0122055 A1 | 9/2002 | Parupudi et al. | |
| 2002/0130178 A1 | 9/2002 | Wan et al. | |
| 2002/0133545 A1* | 9/2002 | Fano et al. | 709/203 |
| 2002/0151326 A1 | 10/2002 | Awada et al. | |
| 2002/0165008 A1 | 11/2002 | Sashihara et al. | |
| 2003/0017848 A1 | 1/2003 | Engstrom et al. | |
| 2003/0019929 A1 | 1/2003 | Stewart et al. | |
| 2003/0030542 A1 | 2/2003 | Von Hoffmann | |
| 2003/0056019 A1 | 3/2003 | Kehr et al. | |
| 2003/0074566 A1 | 4/2003 | Hypponen | |
| 2003/0088496 A1 | 5/2003 | Piotrowski | |
| 2003/0191839 A1 | 10/2003 | Seljeseth | |
| 2003/0194989 A1 | 10/2003 | Guion | |
| 2004/0000585 A1 | 1/2004 | Silverbrook et al. | |
| 2004/0033798 A1 | 2/2004 | Robin et al. | |
| 2004/0075675 A1 | 4/2004 | Raivisto et al. | 345/700 |
| 2004/0083138 A1 | 4/2004 | Silverbrook et al. | |
| 2004/0087273 A1 | 5/2004 | Perttila et al. | |
| 2004/0189635 A1 | 9/2004 | Hoisko | |
| 2004/0203693 A1 | 10/2004 | Mehta et al. | |

FOREIGN PATENT DOCUMENTS

| | | |
|---|---|---|
| EP | 1059599 | 12/2000 |
| EP | 1130495 | 9/2001 |

| | | |
|---|---|---|
| EP | 1130933 | 9/2001 |
| EP | 1 197 905 A2 | 4/2002 |
| FI | 2002/2288 | 12/2002 |
| GB | 2 246 491 A | 1/1992 |
| KR | 2002-0043631 | 6/2002 |
| KR | 2002-0080162 | 10/2002 |
| RU | 2 116 008 C1 | 7/1998 |
| WO | WO 97/10558 | 3/1997 |
| WO | WO 97/17790 | 5/1997 |
| WO | WO 97/28736 | 8/1997 |
| WO | WO 97/41654 | 11/1997 |
| WO | WO 97/46960 | 12/1997 |
| WO | WO 98/35469 | 8/1998 |
| WO | WO 99/17230 | 4/1999 |
| WO | WO 99/30257 | 6/1999 |
| WO | WO 00/16507 | 3/2000 |
| WO | WO 00/62260 A1 | 10/2000 |
| WO | WO 00/74406 | 12/2000 |
| WO | WO 01/06507 | 1/2001 |
| WO | WO 01/17297 | 3/2001 |
| WO | WO 01/20542 | 3/2001 |
| WO | WO 01/25985 | 4/2001 |
| WO | WO 01/39103 | 5/2001 |
| WO | WO 01/39108 | 5/2001 |
| WO | WO 01/45038 | 6/2001 |
| WO | WO 01/45061 A2 | 6/2001 |
| WO | WO 01/45319 | 6/2001 |
| WO | WO 01/47291 | 6/2001 |
| WO | WO 01/73687 | 10/2001 |
| WO | WO 01/74011 | 10/2001 |
| WO | WO 01/75815 | 10/2001 |
| WO | WO 01/99410 | 12/2001 |
| WO | WO 02/07474 A1 | 1/2002 |
| WO | WO 02/33669 A1 | 4/2002 |
| WO | WO 2004/003829 A1 | 1/2004 |
| WO | WO 2004/027689 A2 | 4/2004 |
| WO | WO 2005/101337 | 10/2005 |

OTHER PUBLICATIONS

"*CodeXML Router—Bluetooth Edition*", product sheets (2 pp), printed from www.gocode.com on Jul. 2, 2004.
"Code Router BE Diagram", http://www.gocode.com/routerdiagram.htm, 1 page, printed on Jul. 2, 2004.
"*CodeXML Maker Pro*", http://www.gocode.com/products/maker.htm, 1 page, printed on Jul. 2, 2004.
"*CodeXML Maker Pro Screen*", http://www.gocode.com/products/images/makerpro-screen.jpg, 1 page, printed on Jul. 2, 2004.
"*CodeXML Bluetooth Modem*", http://www.gocode.com/products/modem,htm, 1 page, printed on Jul. 2, 2004.
"Code Router BE Use Case Diagram", http://www.gocode.com/routerdiagram2.htm, 1 page, printed on Jul. 2, 2004.
"*GoCode—Secure Data Solucitons*", http://www.gocode.com/products/gocode.htm, 3 pp, printed on Jul. 2, 2004.

NeoMedia Technologies Inc., "*Patent Infringement Lawsuit Brought by NeoMedia Against AirClic Inc., Scanbuy, Inc., and LScan Technologies Inc.*", dated Jan. 26, 2004, 2 pages, http:/www.neom.com/oorporate/press/2004/20040126.jsp, printed Apr. 15, 2004.
Symbol Technologies Ltd., "*Solutions 8 Fastfrog Case Study*", http://www.symbol.com/uk/News/solutions_8_fastfrog_case_stud.html, 2 pages, printed on Apr. 15, 2004.
"*CueCat Barcode scanner from Digital Convergence Information*", http://www.cuecat.com, 2 pages, printed on Sep. 16, 2005.
iTCaseStudies.com "*Uniting Space and Place for Future Growth*", 4 pages, http://www.itcasestudies.com/case/ret37.html, printed on Apr. 15, 2004.
Stephen Satchell, "*CueCat Principles of Operation*", 4 pages, http://www.fluerit-access.com/wtpapers/cuecat, printed on Apr. 15, 2004.
Symbol Technologies, Inc. "*Symbol Technologies' Consumer Scanners Provide Mall Shoppers With Internet Shopping Experience*", dated Dec. 6, 1999, 3 pages, http://www.symbol.com/news/pressreleases/press_releases_retail_consumer.html, printed on Apr. 15, 2004.
NeoMedia Technologies, "*Virgin Entertainment, Virgin Megastore Online and Virgin Mega Store Are Charged with Patent Infringement by NeoMedia Technologies, Inc.*", dated Jan. 5, 2004, 2 pages, http://www.neom.com/corporate/press/2004/20040105.jsp, printed on Apr. 15, 2004.
12snap UK Ltd. "*12snap That's Mobile Marketing*", 38 pages, http://www.12snap.com/uk/index2.html, printed on Apr. 15, 2004.
U.S. Appl. No. 10/882,619, filed Jul. 2, 2004, Hartti Suomela et al.
U.S. Appl. No. 10/291,038, filed Nov. 8, 2002, Vanska et al.
"UMTS and mobile computing", Alexander Joseph Huber & Josef Franz Huber, Mar. 2002, Artech House Mobile Communication Series, pp. 170-187, 231-232.
AIM Inc. "Radio Frequency Identification RFID—A Basic Primer" White paper, V 1.2, Aug. 23, 2001.
Mandato et al. "CAMP: A context-Aware Mobile Portal", IEEE , vol. 40 No. 1, Jan. 2002, pp. 90-97.
"User's Guide Nokia 6310i" 2002, pp. 1-115.
"vCard: The Electronic Business Card", White Paper, webpage [online], IMC, [5 pages retrieved on Feb. 5, 2002]. Retrieved from the Internet: <http://www.imc.org/pdi/vcardwhite.html>.
"vCard Overview", webpage [online], IMC, [3 pages retrieved on Feb. 5, 2002]. Retrieved from the Internet: <http://www.imc.org/pdi//vcardoverview.html>.
"Products Using vCard and vCalendar Technology", webpage [online], IMC [9 pages retrieved on Feb. 5, 2002]. Retrieved from the Internet <http://www.imc.org/pdi/pdiprodslits:html>.
U.S. Appl. No. 10/174,405, filed Jun. 17, 2002, Vanska et al.
U.S. Appl. No. 10/179,237, filed Jun. 26, 2002, Sairanen et al.
U.S. Appl. No. 10/191,735, filed Jul. 8, 2002, Vanska et al.
U.S. Appl. No. 10/284,253, filed Oct. 31, 2002, Perttila et al.
U.S. Appl. No. 10/286,221, filed Nov. 1, 2002, Vanska et al.
U.S. Appl. No. 10/180,267, filed Jun. 26, 2002, Byman-Kivivuori et al.

* cited by examiner

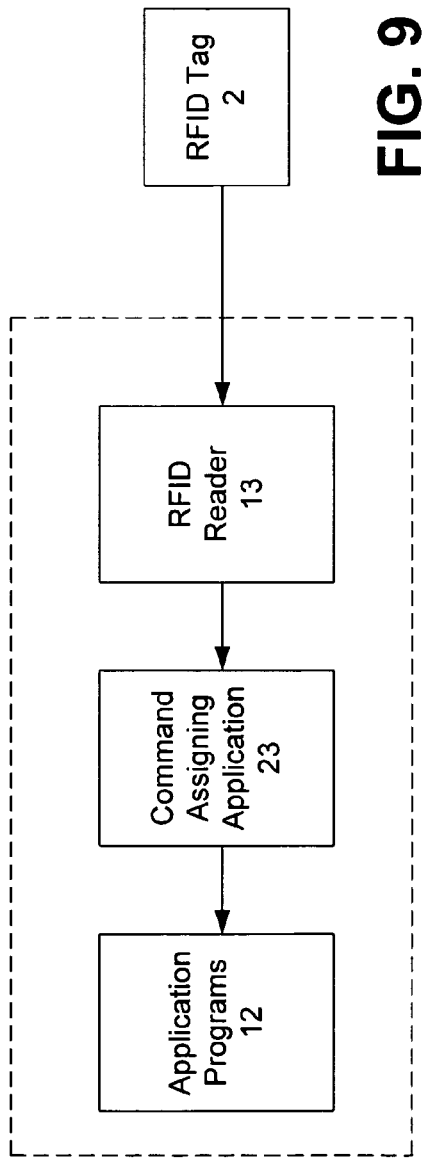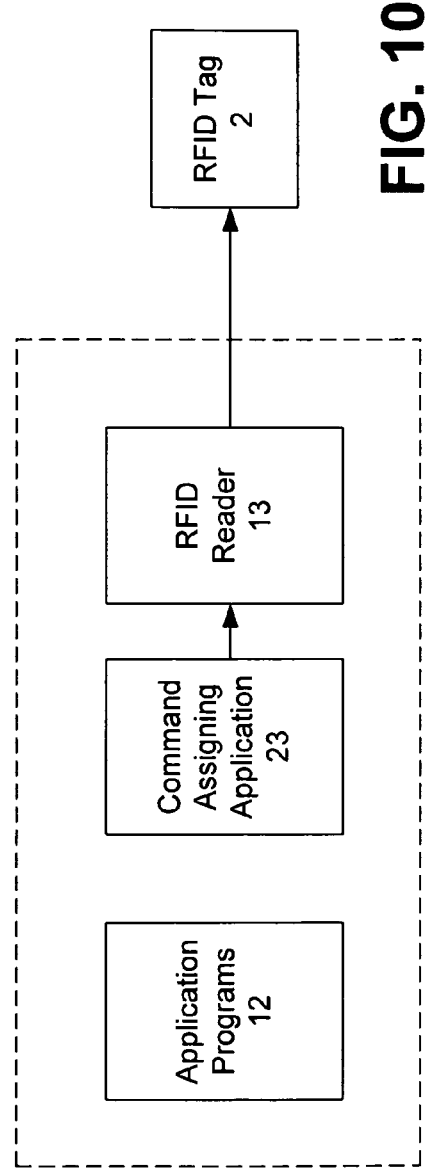

APPARATUS, SYSTEM, METHOD AND COMPUTER PROGRAM PRODUCT FOR CREATING SHORTCUTS TO FUNCTIONS IN A PERSONAL COMMUNICATION DEVICE

FIELD OF THE INVENTION

The present invention is directed generally to the integration of machine-readable tags and tag readers with a personal communication device to improve device functionality.

BACKGROUND OF THE INVENTION

Personal communication devices have become ubiquitous in every day life not only for busy adults but for young people as well. Additionally, the demand for increased functions performed by such devices has also increased. Thus, it is not enough to just perform more functions quickly. It is equally important to perform functions that are more relevant to the user. The more personalized the functions, the more useful the personal communication device becomes.

One method of improving the efficiency of receiving information is by using RF tagging systems, more particularly RFID wireless systems. The RFID wireless systems use RFID labels known as tags or transponders that can contain varying amounts of information, and a controller unit usually referred to as a reader or interrogator. RFID interrogators communicate with the tags through the use of radio frequency (RF) energy. RFID wireless network principles are described in a publication entitled "Radio Frequency Identification: A Basic Primer," published by the Automatic Identification Manufacturers (AIM) web site (http://www.aimglobal.org), Oct. 23, 2001 and fully incorporated herein by reference.

Most recently, the use of RFID systems in personal communication devices have been proposed for improving device functionality. However, none of the proposed systems adequately allow for personalizing functions in a personal communication device when an RFID tag is scanned by an RFID reader. More specifically, with the known systems it is not possible to select or create a shortcut to functions in a personal communication device when a signal from an RFID tag is received.

Thus, it would be desirable to provide an apparatus, system, method and computer program product for creating shortcuts to functions in a personal communication device using RF tagging systems, such as, for example an RFID system.

SUMMARY OF THE INVENTION

To overcome limitations in the prior art described above, and to overcome other limitations that will be apparent upon reading and understanding the present application, an apparatus, system, method and computer program product for creating shortcuts to functions in a personal communication device are proposed.

The apparatus and system of the present invention include a personal communication device with an RFID tag reader, at least one RFID tag, a memory location, at least one shortcut stored in the memory location and a processor for processing the shortcut and prompting the selection or creation of a new shortcut. More specifically, the personal communication device is a cellular telephone, a satellite telephone, a personal digital assistant or a Bluetooth device. The RFID tags are active or passive and provide at least RFID information to the RIFD reader when the personal communication device is proximate to an RFID tag. Additionally, the RFID tags can be programmable and have the ability of being write-protected.

Shortcuts include RFID tag information, a command for selecting an application program and a wrapper that defines the format and properties of a shortcut (e.g., XML or SMIL). Additionally, the shortcuts when executed can be used to activate a personal command, macro or script when the personal communication device receives the tag information. The shortcut can be stored in a memory location in the personal communication, RFID tag or network server. The shortcuts can also be shared with other devices by sending a shortcut or part of it over a Bluetooth, cellular or other carrier, or by publishing the same on a public network for access by other devices.

It is also contemplated by the invention that the system includes a network connection for communication between the public network and the personal communication device. The network connection can be a wireless connection using a wireless protocol for transmitting data to and receiving data from the personal communication device. For example, the network connection may use GSM, WAP EDGE, UMTS or other similar wireless mobile telephone network protocol.

The method of the present invention includes receiving and decoding the RFID tag information using the RFID tag reader in the personal communication device. Upon receipt of the RFID information, the processor can execute a preset shortcut stored in a memory, or in the alternative prompt a user to select or create a new shortcut to be stored in the memory. Once executed, the shortcut initiates at least one function of the personal communication device identified by the shortcut. At least part of the shortcut can be determined by the user of a personal communication, therefore, the same RFID information can be used to control different functions in different personal communication devices. For example, RFID information from one tag can be used to send a text message from one device and take a photo in another device.

The computer program product of the present invention includes a computer readable medium with executable code for receiving and decoding the RFID tag information as well as for executing the preset shortcut based on the received RFID tag information. Executable program code is provided for the selection and creation of a new shortcut, and for selecting and executing a function in the personal communication device based on the shortcut. It is also contemplated by the invention that the computer program product further comprises program code for storing a shortcut in a memory location regardless of whether the memory is in the personal communication device, the RFID tag or the network server. The computer program product further includes program code for establishing and maintaining the network connection to a public network for communication between a network server and the personal communication device as well as communicating to other devices using a wireless protocol (e.g., MMS or Bluetooth) or connecting to the Internet.

It is contemplated by the invention that the selection and creation of shortcuts can also be prioritized for more efficient use of network resources. For example, upon receiving RF information, the personal communication device may first scan a memory in the RFID tag, then scan a memory in the personal communication device, and then scan a memory of a network server for a shortcut that corresponds to received RFID tag information.

Additionally, although the use of RFID systems has been disclosed herein, other types of RF tagging systems are believed to be compatible with the present invention as described above. Moreover, it is contemplated that RFID tags can also be replaced with other machine-readable data such as barcodes, which can be used to then program various functions of a personal communication device. Communication between a barcode and the personal communication device can be achieved by a camera function in the device that takes a picture of the barcode. The barcode can then be decoded and processed by the personal communication device for executing a function.

BRIEF DESCRIPTION OF THE DRAWINGS

The accompanying figures best illustrate the details of an apparatus, system, method and computer program product for creating shortcuts to functions in a personal communication device. Like reference numbers and designations in these figures refer to like elements.

FIG. 9 illustrates a system for using a shortcut in an RFID tag in accordance with an embodiment of the present invention.

FIG. 10 illustrates a system for creating a shortcut in an RFID tag in accordance with an embodiment of the present invention.

DETAILED DESCRIPTION OF THE INVENTION

In the following description of the various embodiments, reference is made to the accompanying drawings, which form a part hereof, and in which is shown by way of illustration various embodiments in which the invention may be practiced.

Figure 1:
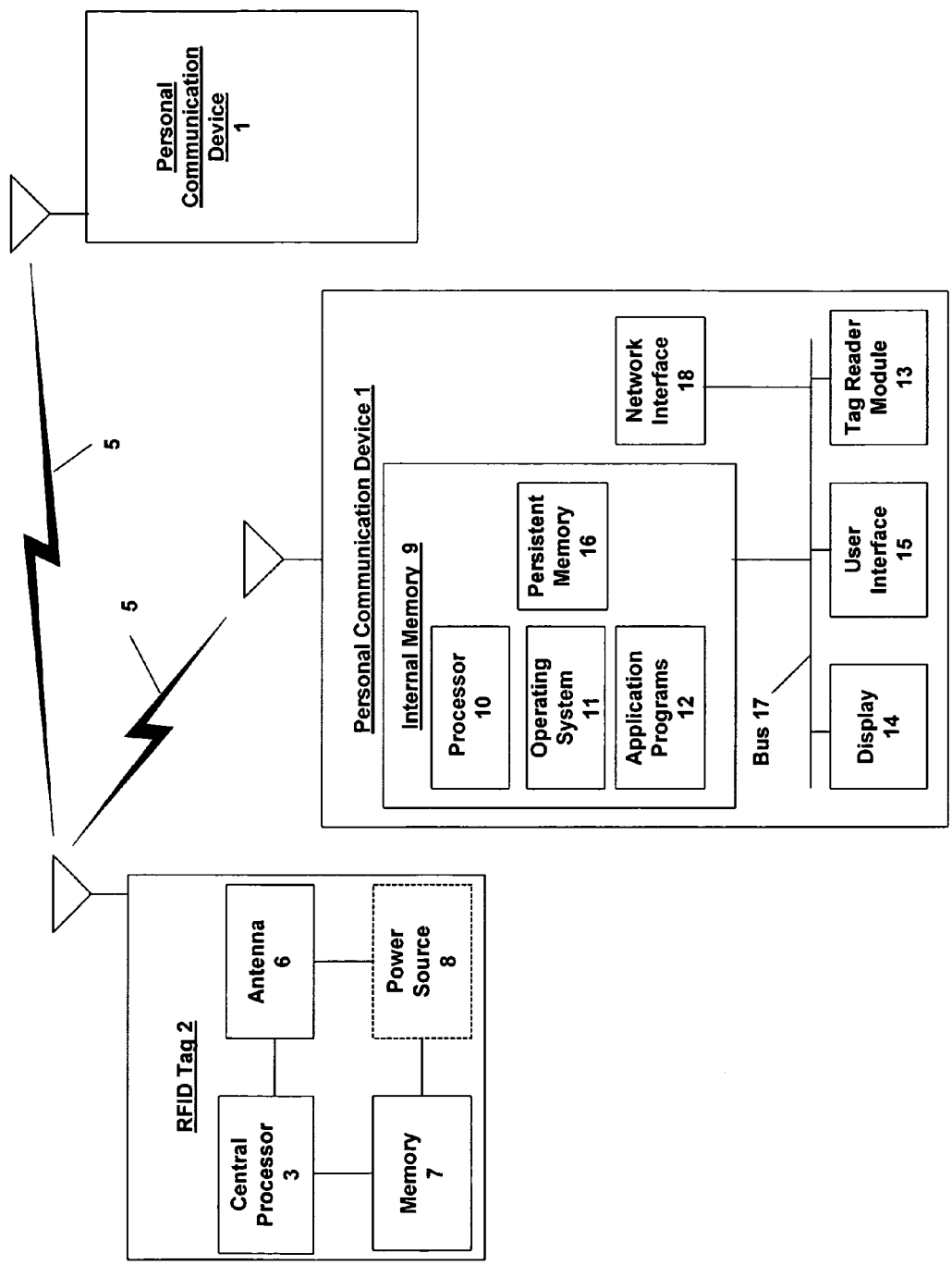
FIG. 1 is a system diagram in accordance with an embodiment of the present invention.

FIG. 1 illustrates a system in accordance with an embodiment of the present invention. In FIG. 1, the system, for simplicity, includes two personal communication devices 1 in communication with a radio frequency identification (RFID) tag 2 via a wireless communication channel 5. It is contemplated by the invention that the RFID tag 2 is passive or active and emits a wireless RF signal. As illustrated in FIG. 1, both the personal communication devices 1 and the RFID tag 2 include several internal components that are essential to their operation.

The RFID tag 2 includes a central processor 3, a memory 7 and an antenna 6. Additionally, the RFID tag 2 can also include an optional power supply 8 depending on whether the tag 2 is active or passive. The central processor 3 enables the RFID tag 2 to execute instructions for the transmission, reception and storage of data. The memory 7 may comprise read-only (ROM), random access (RAM) and non-volatile programmable memory that can be write-protected depending on the type and sophistication of the RFID tag 2. A simple RFID tag may be capable of storing data between 16 and 200 bits while a more complex RFID tag may be able to store at least tens of kilobytes of data. It is contemplated by the invention that the RFID tag 2 used could be, for example, the type manufactured by Innovision, Gemplus or Philips Mifare. One or more RFID tags 2 can be placed in locations and on objects that are pertinent to a user or a plurality of users of personal communication devices 1. For example, it is possible that an RFID tag 2 is integrated with another personal communication device 1 for executing functions on two or more devices 1 as users come in contact with each other. The antenna 6 enables the RFID tag 2 to transmit and receive the wireless communications from the personal communication devices 1. The range of transmission of an RFID tag 2 will vary depending on its sophistication and the application.

The personal communication device 1 can be a cellular telephone, a satellite telephone, a personal digital assistant or a Bluetooth device. The personal communication device 1 includes a tag reader module 13, an internal memory 9, a processor 10, an operating system 11, application programs 12, a display 14, a user interface 15, a persistent memory 16 and a network interface 18. The tag reader module 13 also includes an antenna and decoder (not shown). The antenna 6 enables RF wireless signals to be transmitted to and received from the personal communication device 1. The decoder reads the data in the signal received from the tag 2 and forwards the information to the internal memory 9. The internal memory 9 accommodates the processor 10, operating system 11 and application programs 12 and the persistent memory 16. The personal communication device 1 may further include an RFID tag (not shown), which allows other devices 1 to communicate with the device 1 through the RFID interface. It is also contemplated in one embodiment of the present invention that the RFID readers 13 can establish a direct communication interface between the devices 1. According to yet another embodiment, the RFID reader module 13 may include a dedicated transponder logic (not shown) that enables the reader module 13 to act as an RFID tag 2 in a transponder operation mode, as described in PCT Application No. PCT/IB03/02900 "Reader Device For Radio Frequency Identification Transponder With Transponder Functionality" filed on Jul. 11, 2003 by the Applicant and fully incorporated herein by reference.

The processor 10 executes instructions for the reception, transmission, storage and display of data. The operating system 11 enables the execution of the application programs 12 that control various functions of the personal communication device 1. The persistent memory 16 provides storage protection for data that a user deems critical or sensitive. The user is able to communicate with the personal communication device 1 via the user interface 15. The user interface 15 can be a keyboard, keypad, touch screen or similar user interface for inputting user instructions or otherwise communicating with the personal communication device 1. Communication between the internal components of the personal communication device 1 is achieved via a bus 17, which provides as a common point of electrical connection for all the internal components of the device 1. The communication between the RFID tag 2 and the personal communication device 1 is achieved when the personal communication device 1 comes within the proper range of the RFID tag 2, which, as stated previously, will vary depending on the sophistication of the RFID system.

The network interface 18 enables communication between the personal communication device 1 and a network or another wireless device. The network interface 18 may conform to Bluetooth standard protocols or other wireless LAN standard protocols such as, but in no way limited to, shared wireless access protocol (SWAP), Wireless Personal Area Network (WPAN) protocol, High Performance Radio Local Area Network (HIPERLAN) protocol, or Multimedia Mobile Access Communication (MMAC) protocol. The network interface 18 can also be used to connect with any ordinary mobile telephone connection such as e.g. GSM, WAP EDGE, UMTS, or any similar connection.

Figure 2:
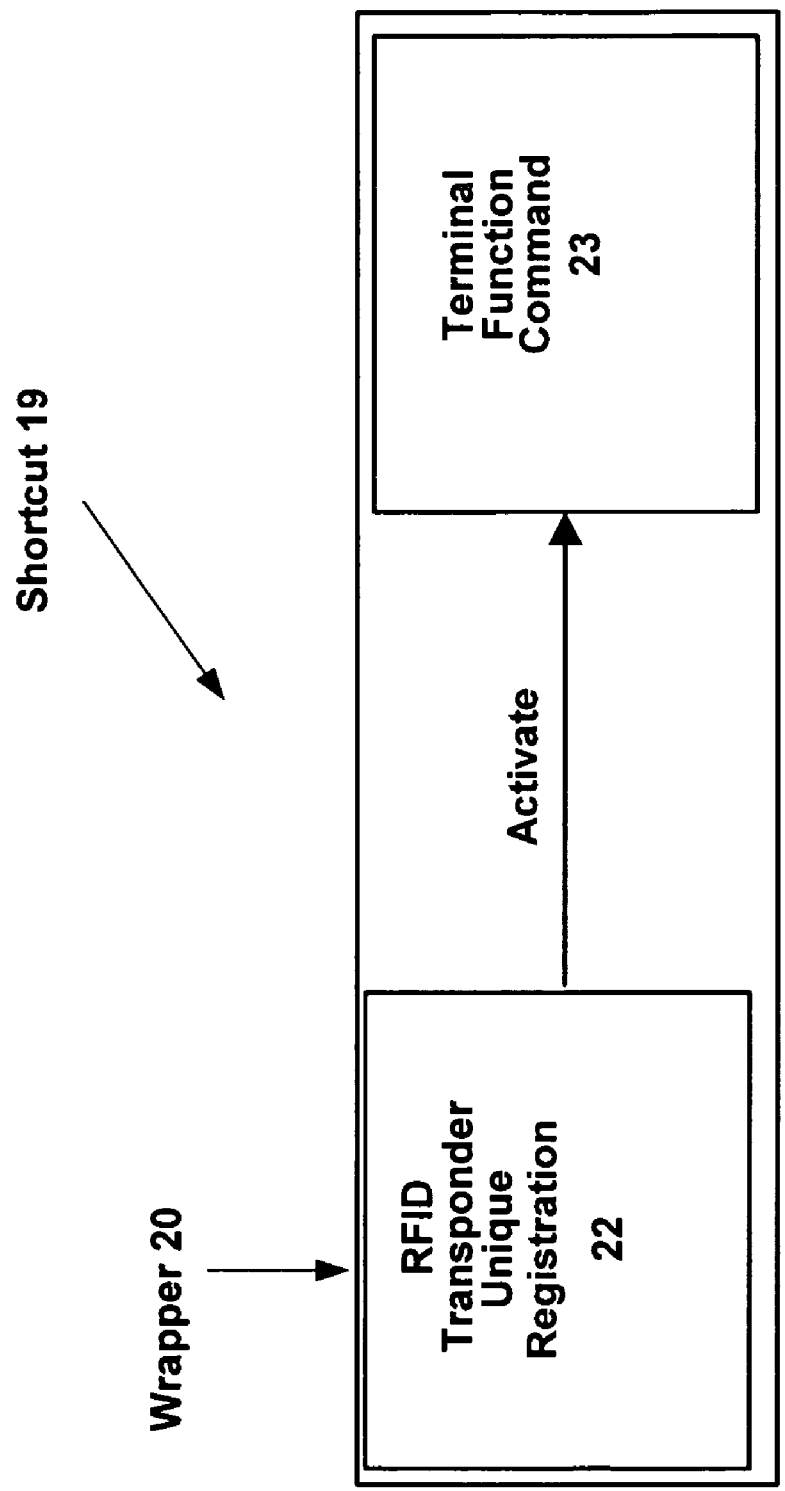
FIG. 2 is a detailed diagram of a shortcut in accordance with an embodiment of the present invention.

FIG. 2 illustrates in more detail a shortcut in accordance with an embodiment of the present invention. It is contemplated by the invention that there are generally three types of shortcuts that will be used by the personal communication device to control functions: 1) personal shortcuts; 2) preset shortcuts; and 3) public shortcuts. These three types of shortcuts will be discussed in more detail in the figures that follow. For simplicity, FIG. 2 will discuss shortcuts in general.

In FIG. 2, the shortcut 19 has three elements: 1) the tag registration or ID 22; 2) a description or information regarding a personal command, macro or script 23; and 3) a wrapper 20 that defines the format and properties of the data contained in the RFID tag 2 (e.g., XML/SMIL). Each shortcut 19 is related to an application 12 for controlling a particular function of the personal communication device 1. A user can personalize the shortcuts 19 so that each RFID tag registration or ID 22 is associated with a different desired application 12 and function in the personal communication device 1.

The following are examples of applications that can be initiated by a shortcut:

1) A tag triggers a macro that makes a phone call. E.g. an RFID tag is placed in a picture frame. To this end, pictures of family members can perform a phone book function. The handicapped and elderly could use this application effectively.
2) A tag triggers a macro that sends a predefined SMS to a company database. For example, a maintenance person indicates his appearance to the maintenance site by swiping the tag.
3) A plurality of tags trigger macros for making calendar entries, differing based on the tag that is triggered. For example, one tag may represent "arrival" and another "departure" and so on. Thus, a user can keep track of his/her use of time.
4) A tag triggers the opening of a WAP connection and access to an electronic newspaper. The tag may reside in a cafeteria or at a user's office, so that during a coffee break, the user may catch up on current events.
5) A tag triggers a macro that changes settings or tools in a device, e.g. from changing from "Ring" mode to "Silent" mode. These tags could be very useful in meeting rooms for example.
6) A tag triggers updates to "presence" information via SMS or SIP message. E.g. a tag represents "At Office." Persons in a buddy list may then see this change. The change of presence is semi-automatic; the user is required to initiate the change, but everything else is carried out automatically without the need for a single key press.
7) A tag triggers a macro that activates a call divert-mode "on".
8) A tag triggers a macro that sends a predefined/stored SMS message to some service, e.g. in order to retrieve phone account balance information or weather forecasts.
9) A tag triggers a macro for displaying a common work project between coworkers, e.g. touching coworkers' personal communication devices 1 leads to triggering applications to open common work projects or documents, or the like. The RFID tag is placed on coworkers' personal communication devices.

The command or macro 23 included in the shortcut 19 may be written in Java Script, Perl, Visual Basic, Python or in some other scripting language. It can also be a binary program that is Operating System Independent (e.g. Java) or dependent on the microprocessor of the system (e.g. Binary executables for certain device using certain microprocessor running, e.g. Symbian OS).

The macro may also comprise an operating system dependent UID (user interface Identification Code) codes that the operating system uses to pass on information and commands in the system, e.g. Opening of certain menus, keyboard input, user selections etc. E.g. In Symbian Operating System, the Macro could include UID codes such as EeikCmdFileOpen or EeikCmdIrdaSend, which are used to carry out a specific function in the program or even to launch programs.

The macro can also contain keycodes, such as EkeyOK, EaknSoftkeyBack, EkeyRightArrow and EkeyMenu (these are used in Symbian OS), which are generated and passed on in the system when a user interface (UI) is used. Thus, the macro mimics the actions of the user as if the user him/herself had used the UI. The most simplistic use of macro would be to store a program name and a parameter in the macro, e.g. webbrowser http:\\www.internet.com\http_parameters, which would launch a web-browser, feed it with stored URL as a parameter from where the desired content eventually is loaded.

Figure 3:
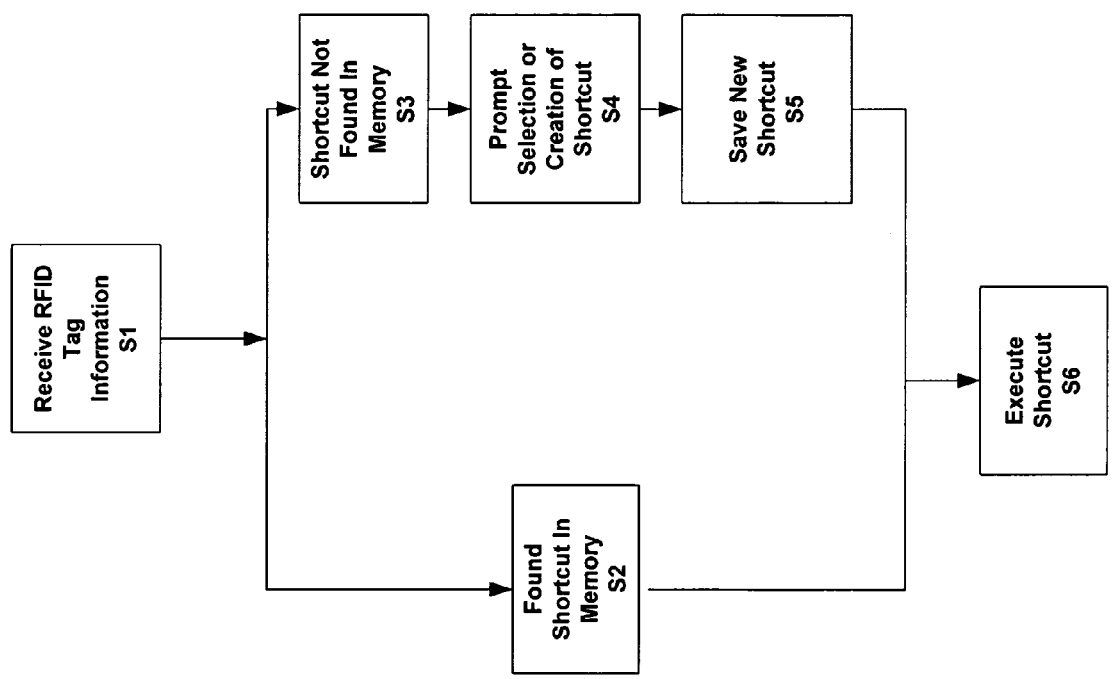
FIG. 3 illustrates a method of using and creating a shortcut in a personal communication device in accordance with an embodiment of the present invention.

FIG. 3 illustrates a method of creating and using a personal shortcut in accordance with an embodiment of the present invention. In step S1, RFID tag information is received by the RFID reader 13 of the personal communication device 1 via the RF channel 5. The RFID tag information includes at least a tag registration or ID 22. The RFID tag information (e.g. registration or ID) is decoded by the RFID reader 13 and is forwarded to the processor 10. In this case, the personal shortcut 19 that corresponds to the RFID information is stored in the internal memory 9 of the personal communication device 1. Accordingly, in step S2, the processor 10 determines if a shortcut 19 corresponding to the RFID tag information can be found in the internal memory 9. If a shortcut 19 is found, then the processor 10 continues to step S6 and executes the command, macro or script 23 in the shortcut 19. On the other hand, if the processor 10 cannot find a shortcut 19 (step S3), then in step S4 the processor 10 prompts the user to either select or create another shortcut 19. The processor 10, in step S5 then saves the new shortcut 19 in the internal memory 9 for future use by the personal communication device 1. In step S6, the processor 10 executes the command, macro or script 23 of the shortcut 19.

The user can define a personal shortcut 19 for any particular RFID tag 2. This means that a certain RFID tag 2 can correspond to different shortcuts 19 in different personal communication devices 1. E.g. a first user can use an RFID tag to change a device to a "Silent" mode, while another user can use the same RFID tag to program his device to fetch a WAP-page containing today's lunch menu.

Figure 4:
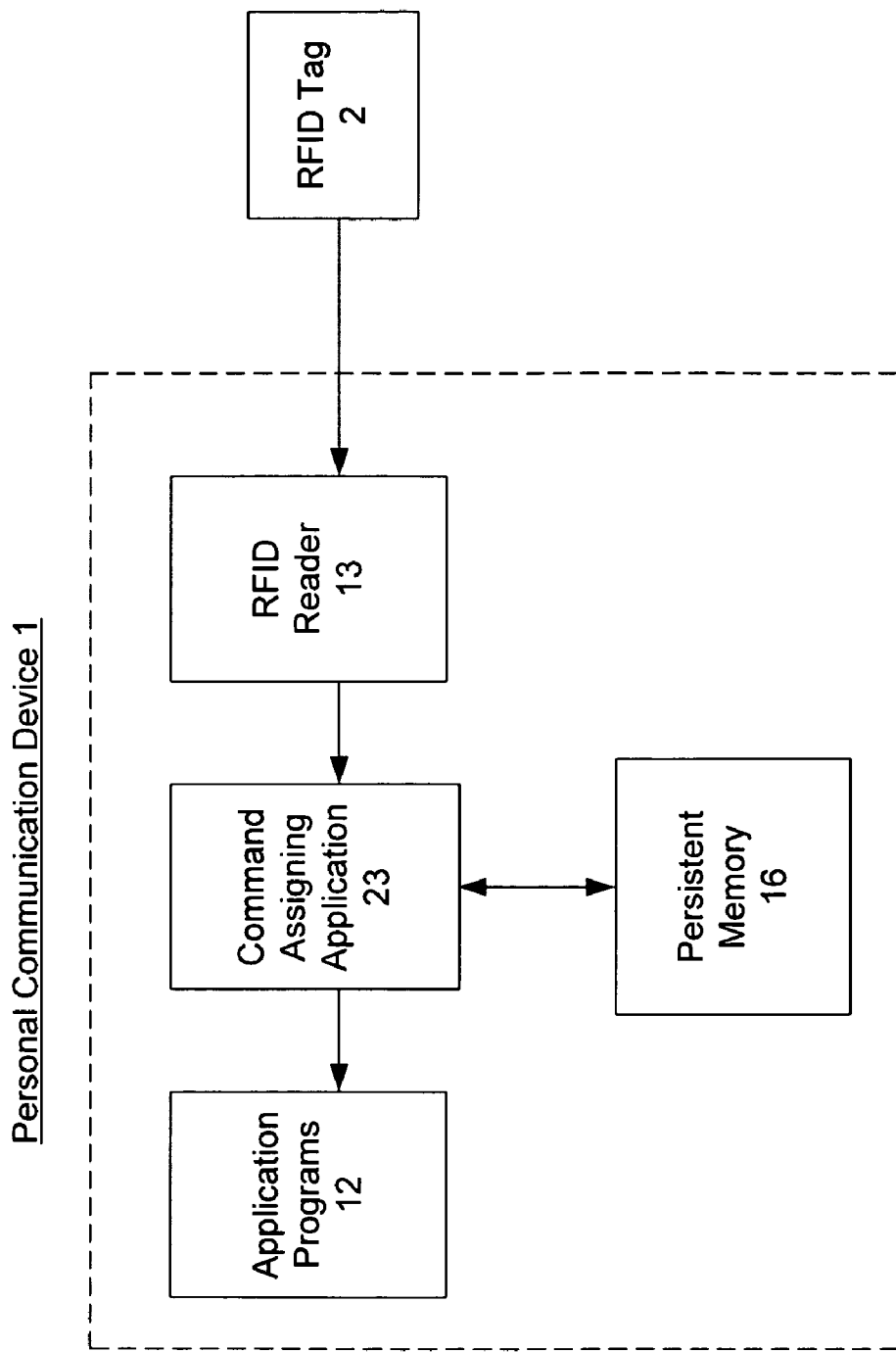
FIG. 4 illustrates a system for using a shortcut in a personal communication device in accordance with an embodiment of the present invention.
Figure 5:
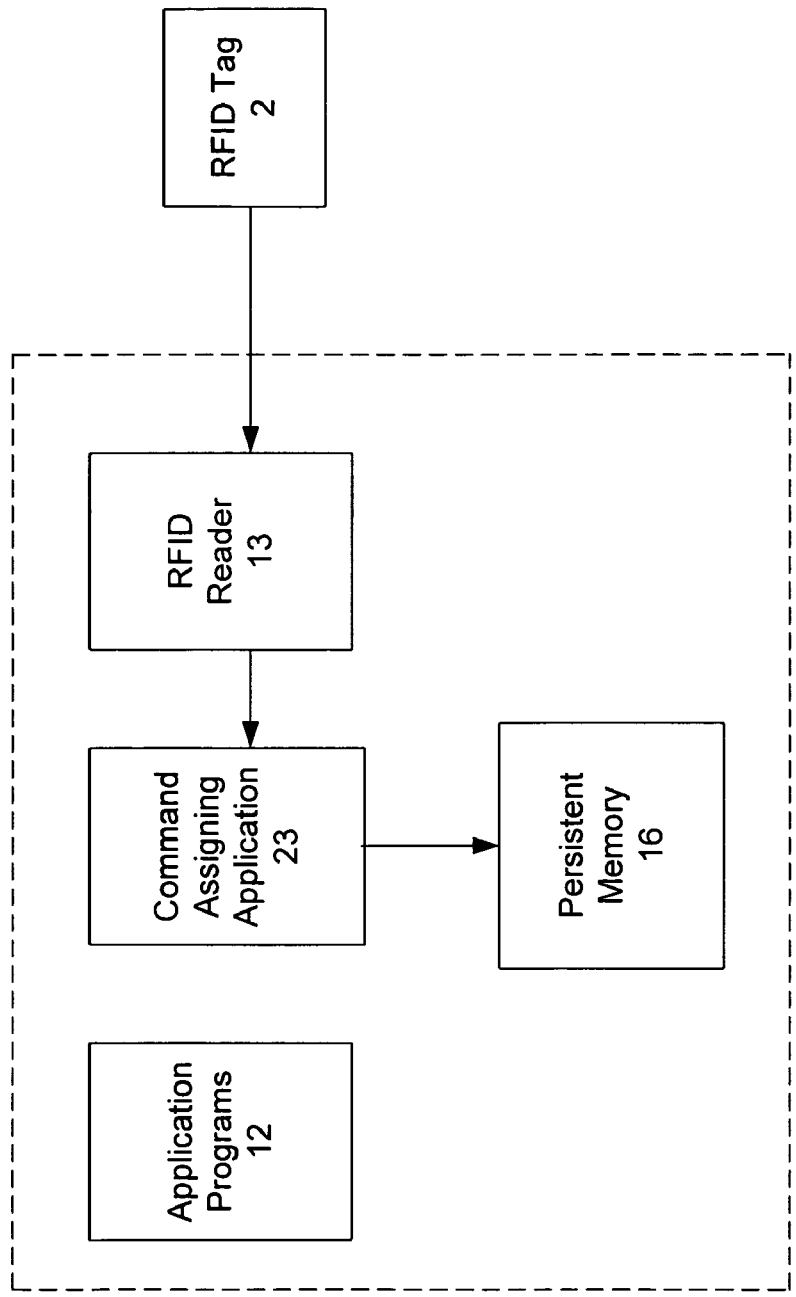
FIG. 5 illustrates a system for creating a shortcut in a personal communication device in accordance with an embodiment of the present invention.

FIGS. 4 & 5 provide systems for using and creating a personal shortcut in accordance with the method described in FIG. 3. In FIG. 4, the system illustrates how a personal shortcut 19 is used while in FIG. 5, the system illustrates how a new personal shortcut 19 is selected or created. In FIG. 4, the RFID tag 2 is sending RFID tag information to the personal communication device 1 and the information is received by the RFID reader 13 of the personal communication device 1. The RFID reader 13 decodes the RF signal and sends the decoded RFID tag information to the processor 10. In this embodiment, the RFID tag information includes an RFID tag registration or ID 22 that is used to identify a particular RFID tag 2. However, the RFID tag 2 can also transmit more data if desired. The processor 10 searches the persistent memory 16 in the internal memory 9 of the personal communication device 1 for a corresponding command 23. The command 23 is then retrieved from the persistent memory 16 and executed by the processor 10. The command 23 is used to select and initiate application software or programs 12 in the personal communication device 1 to control a particular device function such as, but not limited to, displaying data, sending an e-mail, making a call, taking a photo, accessing the Internet or other similar functions.

In FIG. 5, it is contemplated that the processor 10 was unable to find a corresponding shortcut 19 for the RFID information received by the personal communication device 1. In this case, the processor 10 prompts the user to either select a new command or create a command. Accordingly, the user can select a command 23 from any available shortcut 23 stored in the internal memory 9 or create a new shortcut 19 that can be subsequently stored in the internal memory 9 of the personal communication device 1. In any case, the user communicates with the personal communication device 1 using the user interface 15 and display 14. If a new shortcut is created, the processor 10 will store the shortcut in the persistent memory 16.

Figure 6A:
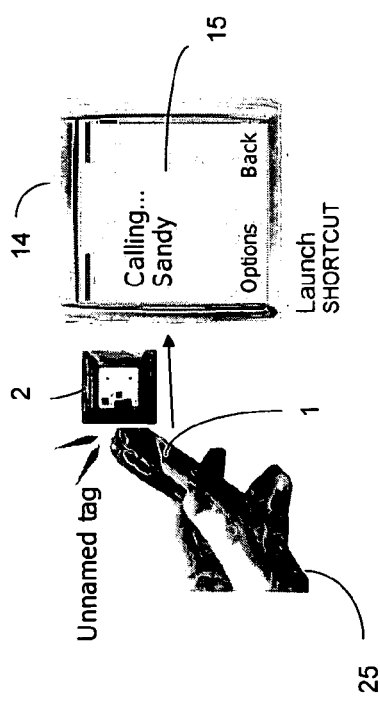
FIGS. 6A & 6B illustrate in more detail an exemplary user interface for using a personal shortcut in a personal communication device in accordance with an embodiment of the present invention.
Figure 6B:
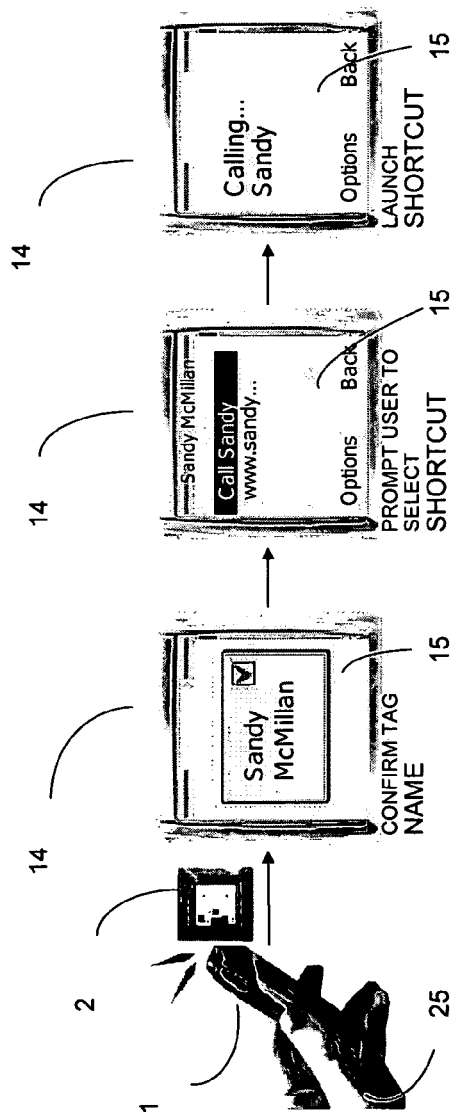

FIGS. 6A & 6B illustrate in more detail the user interface for using a personal shortcut in a personal communication device consistent with the systems described in FIGS. 4 & 5. In FIG. 6A, the user 25 has a personal communication device 1 and initiates communication with an RFID tag 2 placed at a particular location. In this case, communication between the RFID tag 2 and the personal communication device 1 is initiated upon touching the personal communication device 1 to the RFID tag 1. Shortly after initiation of the communication session, the user interface (UI) 15 in the display 14 of the personal communication device 1 indicates the existence of a shortcut 19 in the personal communication device 1 for the RFID tag 2. The UI 15 indicates that the shortcut triggers a call to a friend named "Sandy" (i.e., "Calling Sandy").

In FIG. 6B, upon initiation of the communication session between the personal communication device 1 and the RFID tag 2, the device 1 confirms the RFID tag information received and prompts the user 25 to make a selection. Specifically, the user 25 is prompted to make a selection between two shortcuts 19 related to the RFID tag 2: 1) one related to a phone call; and 2) the other related to a web page. Once a selection is made by the user 25, the UI 15 of the personal communication device indicate the execution of the selected shortcut 19. In this case, the selected shortcut is related to a phone call to a friend (i.e., Calling Sandy).

Figure 7:
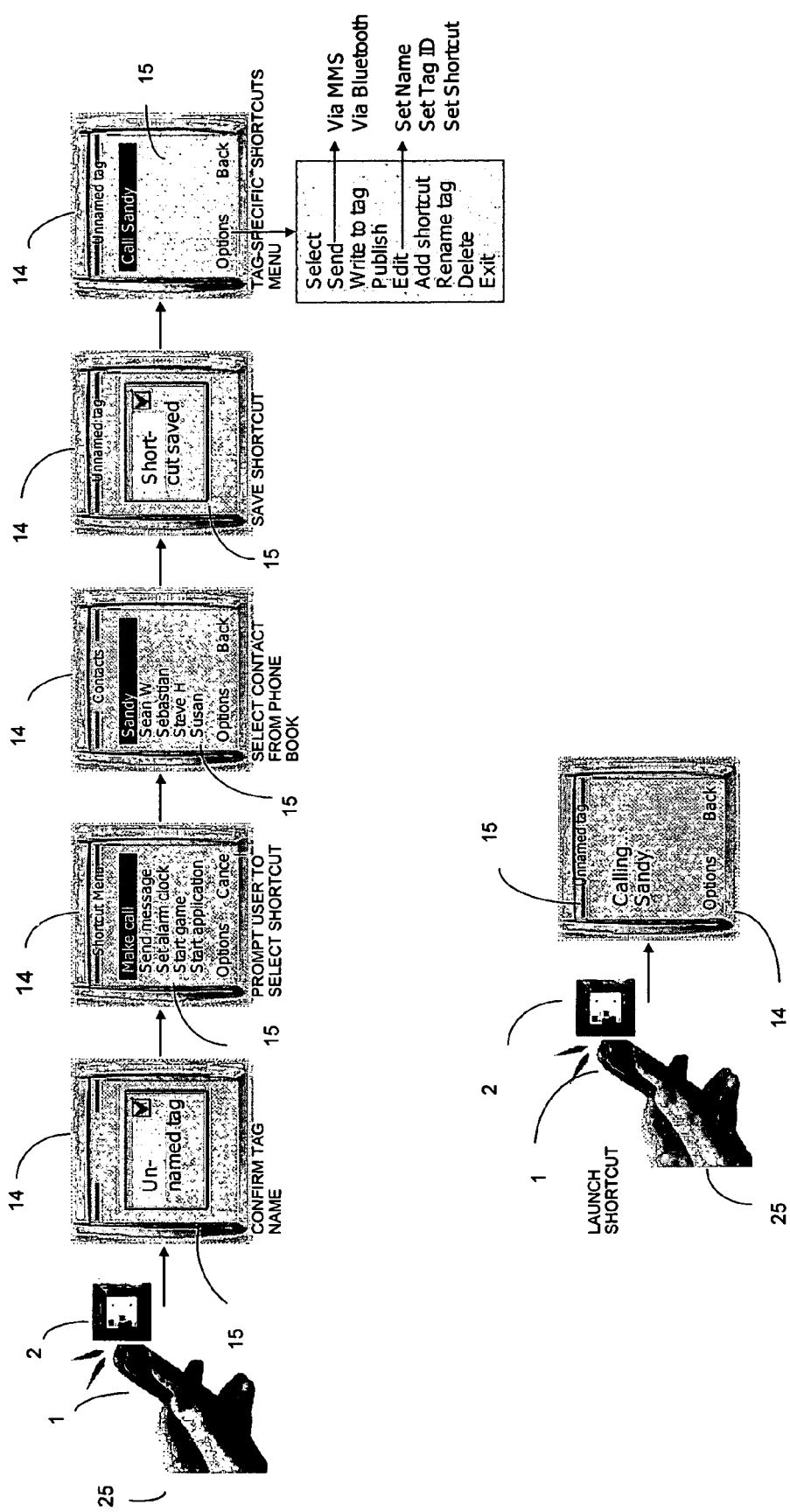
FIG. 7 illustrates in more detail an exemplary user interface for creating a personal shortcut in a personal communication device in accordance with an embodiment of the present invention.

FIG. 7 illustrates in more detail the user interface for creating a personal shortcut in a personal communication device consistent with the system described in FIGS. 4 & 5.

Generally, when the user wants to create or program a new functionality, a recording macro-function is activated. The device 1 returns to a basic state (e.g. idle state). The user 25 uses the UI 15 as if it was a normal usage situation. The recorder records all the inputs the user 25 makes. The recording can be stopped for example by using a specific key or key combination. All the inputs by the user 25 are stored as being part of that macro 23 or activity shortcut 19. Thus, when the macro 23 is run, it mimics the user inputs. Delays between user inputs can be shortened.

Alternatively, the macro recorder (not shown) can investigate the status of the operating system 11 while the user 25 is recording the macro 23 and instead of recording and later replaying key presses as such, it detects which applications 12 are being activated and what parameters are given to these applications 12. The macro recorder can also investigate which menu commands are given and passed through the operating system 11. Thus, in replay-phase, the macro replay system activates the same applications 12 with the same parameters as were running in the recording phase. Also, menu and other commands can be given in the same order as was given by the user during the recording phase.

The recorded macro could contain for example following commands:
<START OF MACRO>
<RFID Tag ID>#23435</RFID Tag ID>
EKeyMenu, EKeyUp, EKeyUp, EKeyOK,
<100 ms pause>, EkeyOK
<Activate>WebBrowser<\Activate Parameter: http:\\www.nokia.com>
<Menu Command>MENU_COMMAND_ID_#23<\Menu Command> <Explanation:>Clear Cache<\Explanation>
<200 ms pause>, EkeyOK
<END OF MACRO>

The above macro 23 could for example first mimic the user input so that the device 1 is set up in some certain state, then the macro 23 activates an application 12 and gives menu commands to the application 12 (rather than user key inputs), which would clear the cache of the web browser. After a little pause, the macro 23 would, for example, answer to a system dialog window "Are you sure you want to clear cache" by mimicking user's key press for OK option. Pauses are needed in order for the system to be able to carry out activities, e.g. display option windows etc. The macro 23 can be stored in a memory 16, 27 or in an RFID tag 2. If the macro 23 is stored in the memory 16, 27, there needs to be a reference in an RFID-Macro table (not shown) in the memory 16, 27 for RFID tag ID 22 to refer to a corresponding Macro/Script/binary executable location. However, the RFID information may optionally be part of the macro 23 as well.

With the above information in mind, in FIG. 7 the user 25 of the personal communication device 1 initiates a communication session with an RFID tag 2. The personal communication device 1 then determines that there is no shortcut created for the RFID tag 2. Accordingly, the user 25 is prompted to create a shortcut 19 to correspond to the RFID tag 2. The UI 15 of the device 1, prompts the user 25 to select from various device functions that will be triggered in future communications with the RFID tag 2. In this case, the user 25 selects a phone call function that will execute a phone call to a friend, e.g. "Sandy." The new shortcut 19 is then saved in a memory location as indicated by the display 14 of the device 1. Using the UI 15, the user 25 can also specify format and protocol for a particular shortcut 19 as well as make changes to shortcut information. Once the new shortcut 19 is complete, the shortcut 19 can be executed upon future communications between the RFID tag 2 and the personal communication device 1, which will be indicated by the display 14 of the device 1.

Figure 8:
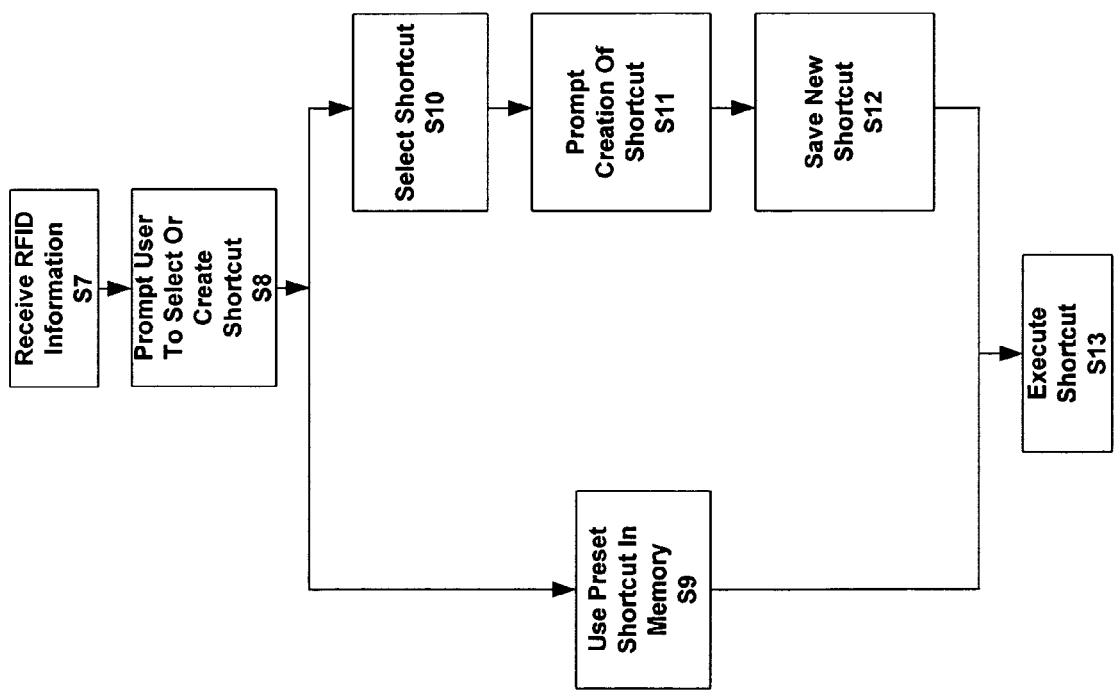
FIG. 8 illustrates a method of creating a shortcut in an RFID tag in accordance with an embodiment of the present invention.

FIG. 8 illustrates a method of using and creating a preset shortcut that is stored in the RFID tag 2.1. It is contemplated by the invention that the user has access to an RFID writer and the RFID tags 2 are programmable. Additionally, it is preferable that the user will have the option to set "programmed" tags as write-protected to ensure the integrity of the preset shortcuts 19. A new shortcut 19 can also be selected or created in an RFID tag 2. Selection and creation of a shortcut 19 in an RFID tag 2 will be discussed in detail in the figures that follow.

Similar to method discussed in FIG. 3, the method in FIG. 8 starts with RFID tag information being received by the RFID reader 13 of the personal communication device 1 via the channel 5 (step S7). In this method, however, the RFID tag information received includes a preset shortcut 19 stored in the RFID tag memory 7. The preset shortcut 19 includes a registration or ID 22 and at least one command 23. Once the RFID tag information is decoded, the processor 10 in step S8 prompts the user to either use the preset shortcut 23 stored in the RFID tag 2 or, select or create a new shortcut 19. This preset shortcut 19 will be proposed to all users who touch or come in the range of the RFID tag 2. Additionally, one RFID tag 2 may contain multiple preset shortcuts 19 so that after reading the RFID tag 2, a user can select among several shortcuts 19. In step S9, the user decides to use the preset shortcut 19 and in step S13, the processor executes the corresponding command 23 of the shortcut 19.

In step S8, the user decides instead to select or create a new shortcut 19. However, in step S10, the user cannot find a suitable alternate shortcut 19 in the memory 7, so in step S11 the user is prompted to create a new shortcut 19 to be stored in the RFID memory 7. In step S12, the processor 10 stores the newly created shortcut 19 in the memory of the RFID tag, and in step S13 the new shortcut 19 is executed by the processor 10. It is also contemplated by the present invention that the selection and creation of shortcuts 19 can be prioritized for more efficient use of network resources, which will be discussed in more detail in FIG. 14.

FIGS. 9 & 10 provide a system for using and creating a preset shortcut in an RFID tag 2 in accordance with the method described in FIG. 8. FIG. 9 illustrates a system for using the preset shortcut while FIG. 10 illustrates a system for creating the preset shortcut. In FIG. 9, the RFID tag 2 is sending RFID tag information that is received by the RFID reader 13 of the personal communication device 1. The RFID reader 13 decodes the RF signal and sends the decoded RFID tag information to the processor 10. In this case, the RFID tag information includes a preset shortcut 19 that includes at least an RFID ID 22 and a command 23. The processor 10 prompts the user to select a preset shortcut 19 stored in the RFID tag 2 or create a new shortcut via the user interface 15 and display 14. The processor 10 will then use the corresponding command 23 in the shortcut to select and initiate application software or programs 12 in the personal communication device 1.

FIG. 10 illustrates a similar system for creating a preset shortcut in accordance with the method described in FIG. 8. In FIG. 10, it is contemplated that the user chooses to create a new preset shortcut 19 when prompted by the processor 10. Additionally, it is contemplated by the invention that the personal communication device 1 is equipped with an RFID tag writer (not shown) as well as an RFID reader 13. The user creates a new preset shortcut 19 using the user interface 15 and display 14. The processor 10 then forwards the information for the preset shortcut 19 to the RFID tag 2 via the RFID reader 13. The new preset shortcut 19 is programmed and stored in the memory of the RFID tag 2 for future use by the personal communication device 1.

Figure 11:
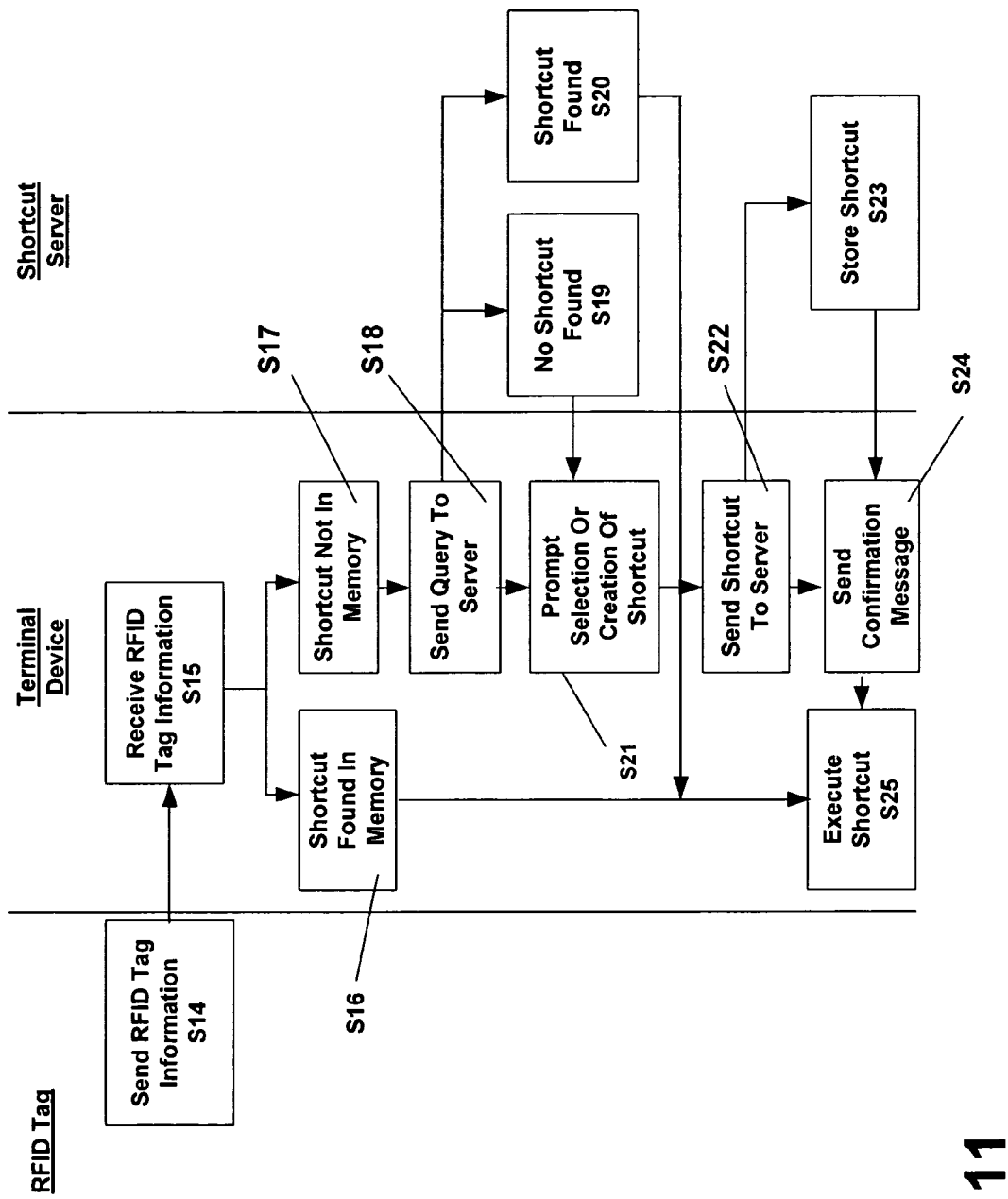
FIG. 11 illustrates a method of using and creating a public shortcut in accordance with an embodiment of the present invention.

FIG. 11 illustrates a method of using and creating a public shortcut in accordance with an embodiment of the present invention. This description will discuss only the distinguishable features between this method and the methods already discussed in FIGS. 3 & 8.

In this case, after receiving the RFID information (steps S14 & S15), the processor 10 searches the memory of the personal communication device 1 for a stored shortcut 19 that correspond to the received RFID tag information (steps S16 & S25). In step S17, if no shortcut 19 can be found, the processor 10 in step S18, will send a query to an external memory or server 27. The personal communication device 1 sends the RFID tag information to a predefined address. The RFID tag 2 may contain the information, or there could be a predefined address stored in the memory 9 of the personal communication device 1. Additionally, an identification or ID for the personal communication device 1 may also be included in the information sent to the server 27, which enables more personalized shortcuts 19 for different devices 1. In step S19, if no command 23 corresponding to the RFID tag 2 can be found in the server 27, the user is prompted to create a new shortcut 19 in step S21.

The personal communication device 1 or the server 27 may initiate the prompting to create the new shortcut 19. For example, the server will prompt the personal communication device 1 to create a shortcut 19, or provide the device 1 with shortcut information in order to perform the preferred action. After creating the new shortcut 19, in step S22 the processor 10 in the personal communication device 1 sends the shortcut 19 to the server 27 for registration and storage. Once the newly created shortcut is registered, in step S24 the user receives a message from the server 27 regarding the registration. In the alternative, if a shortcut 19 is found (step S20), the shortcut corresponding to the RFID tag 2 is executed in step S25.

Figure 12:
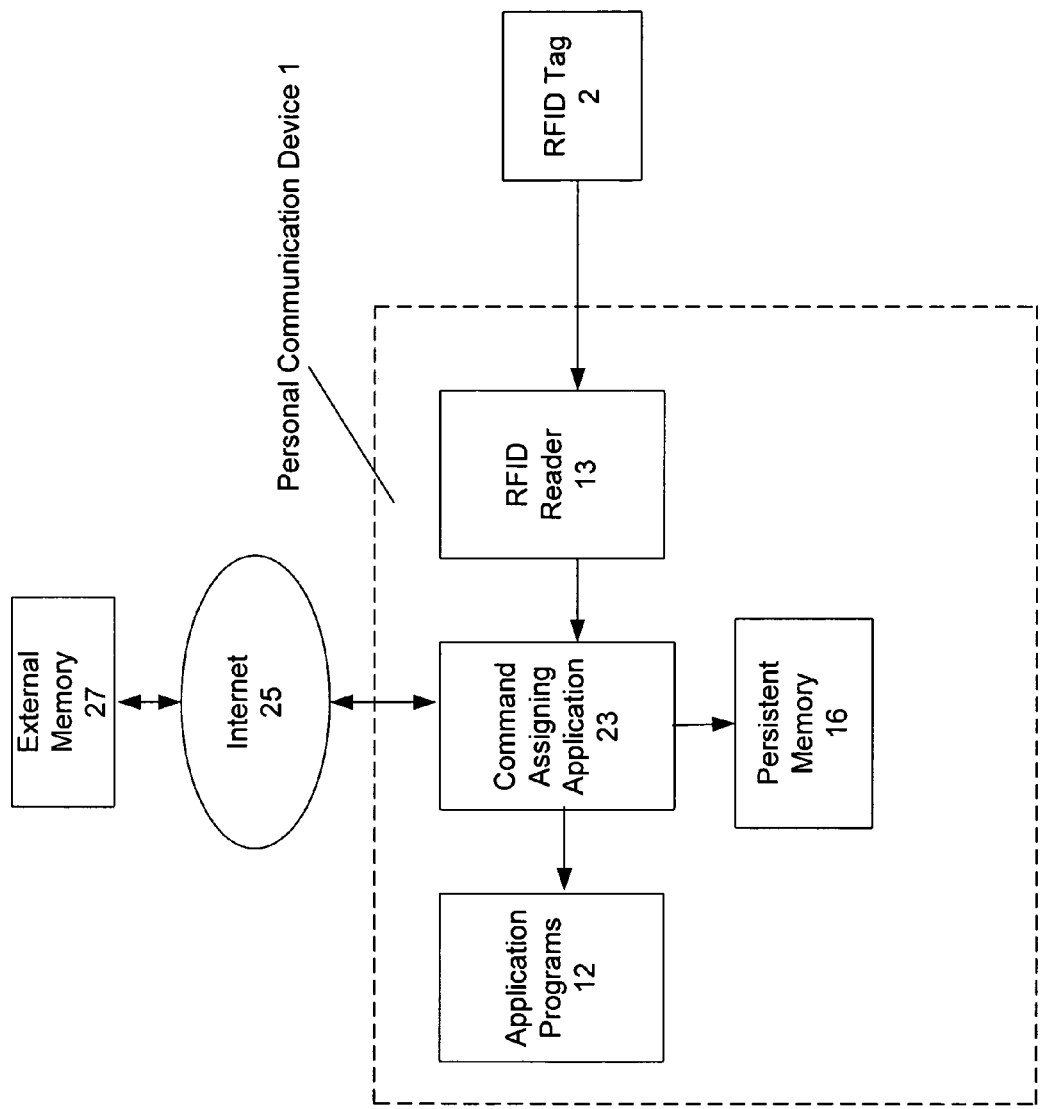
FIG. 12 illustrates a system for using a public shortcut in accordance with an embodiment of the present invention.
Figure 13:
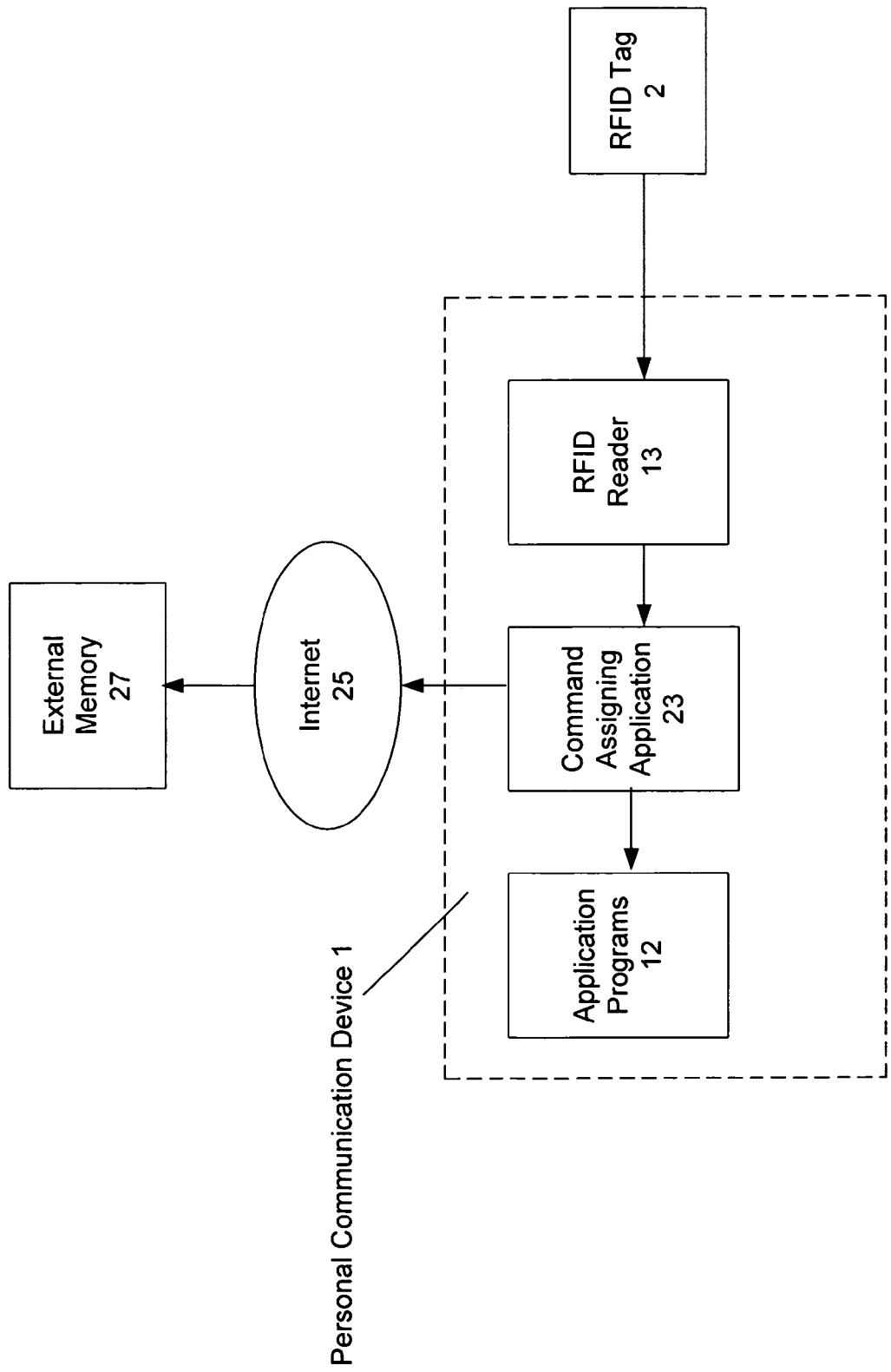
FIG. 13 illustrates a system for creating a public shortcut in accordance with an embodiment of the present invention.

FIGS. 12 & 13 provide systems for using and creating a public shortcut 19 that is stored in a server in accordance with the method described in FIG. 11. FIG. 12 illustrates a system for using a public shortcut while FIG. 13 illustrates a system for creating a public shortcut. The main distinction between these systems and the systems in FIGS. 9 & 10 is the communication between the personal communication device 1 and the server 27. In FIG. 12, after receiving the RFID tag information, the processor 10 sends a query to the server 27 via a network interface 18. For simplicity, the connection to the server 27 is via the Internet 25. The query includes at least the RFID tag information. If a corresponding shortcut 19 is found, the shortcut 19 is returned to the personal communication device 1 via the same network connection 18.

It is also contemplated by the invention that in addition to RFID tag information some ID information relating to the device or the user is added to the request allowing one additional way for creating personalized shortcuts. This type of approach may allow also directing shortcuts to certain devices, e.g. a user of device A wants to make a shortcut to devices B's user, which is possible if the ID of the request is somehow commonly recognized.

FIG. 13 illustrates a system for creating a shortcut 19 that is stored and registered in the server 27. In FIG. 13, the processor 10 is unable to find a corresponding shortcut 19 either in the server 27 or in the personal communication device 1. Once prompted to create a new shortcut, the user sends the new shortcut 19 via the network connection to the server 27. The server 27 stores and registers the shortcut 19 for use by any user having access to the network 25.

Figure 14:
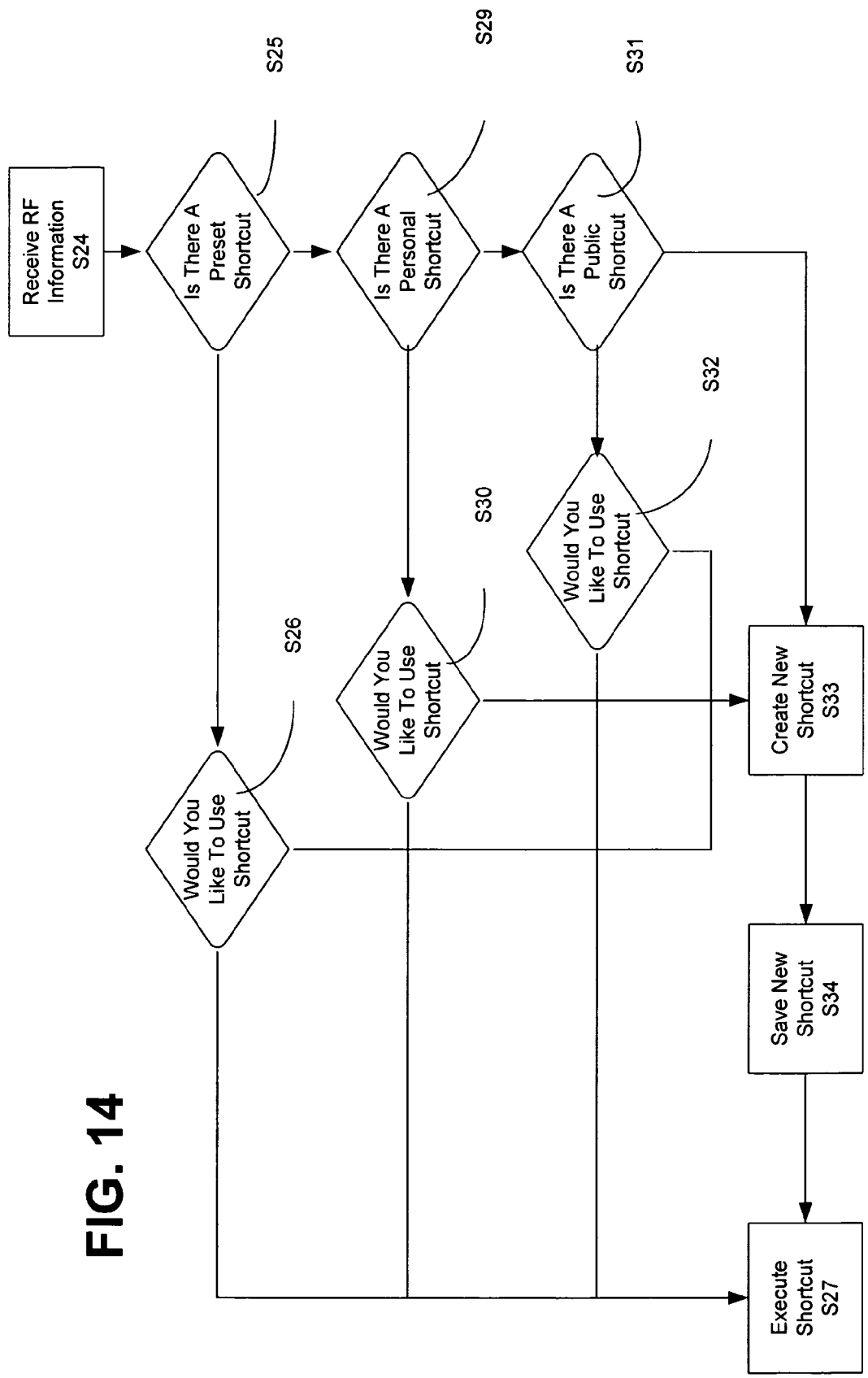
FIG. 14 illustrates a method of prioritizing resources for selecting and creating shortcuts in accordance with an embodiment of the present invention.

FIG. 14 illustrates a method of prioritizing the selection and creation of shortcuts in accordance with an embodiment of the present invention. In step S24, the personal communication device 1 receives RF information from an RFID tag 2. In step S25, the personal communication device 1 reads the tag ID 22 and searches for a corresponding preset shortcut 19. If a preset shortcut 19 exists, then in step S26 the user is prompted to execute the preset shortcut 19. If the user selects the preset shortcut 19, then in step S27, the preset shortcut 19 is executed. However, in step S26, if the user decides to select or create a new shortcut 19, then in step S33 a new short cut 19 is created. In steps S34, the newly created shortcut 19 is stored in the RFID tag 2 for future execution in step S27.

In S25, if no shortcut is found in the RFID tag 2, then in step S29 the personal communication device 1 checks for a corresponding personal shortcut 19 in the memory 16 of the device 1. If a personal short 19 exists in the memory 16, then in step S30 the user is prompted to select the personal shortcut 19 for execution. If the personal shortcut 19 is selected, then in step S27, the shortcut 19 is executed. In step S30, if the user decides instead to select or create a new shortcut, then in steps S33 and S34 the new shortcut is created and stored in the memory 16 for future execution in step S27.

In step S29, if no personal shortcut 19 exists, then in step S31 the personal communication device 1 checks for a corresponding public shortcut 19 in the external memory 27. If a public shortcut 19 is found, then in step S32 the user is prompted to select the public shortcut 19 for execution in step S27. In step S32, if the user decides instead to select or create a new shortcut, then in steps S33 and S34, the new shortcut is created and stored in the external memory 27 for future execution in step S27. The prioritization discussed above ensures that no unnecessary network resources are utilized in connection with reading machine-readable tags, such as RIFD tags.

It also contemplated in an alternative embodiment that step S29 is performed before step S25. In other words, it is first determined if a corresponding shortcut 19 is stored in the device 1 memory 16 before searching the memory 7 in the RFID tag 2 for a corresponding shortcut 19. However, in either case, steps S25 and S29 are performed before S31.

It is also contemplated that although the use of RFID systems have been disclosed, other types of RF tagging systems are compatible with the present invention as described above.

Figure 15:
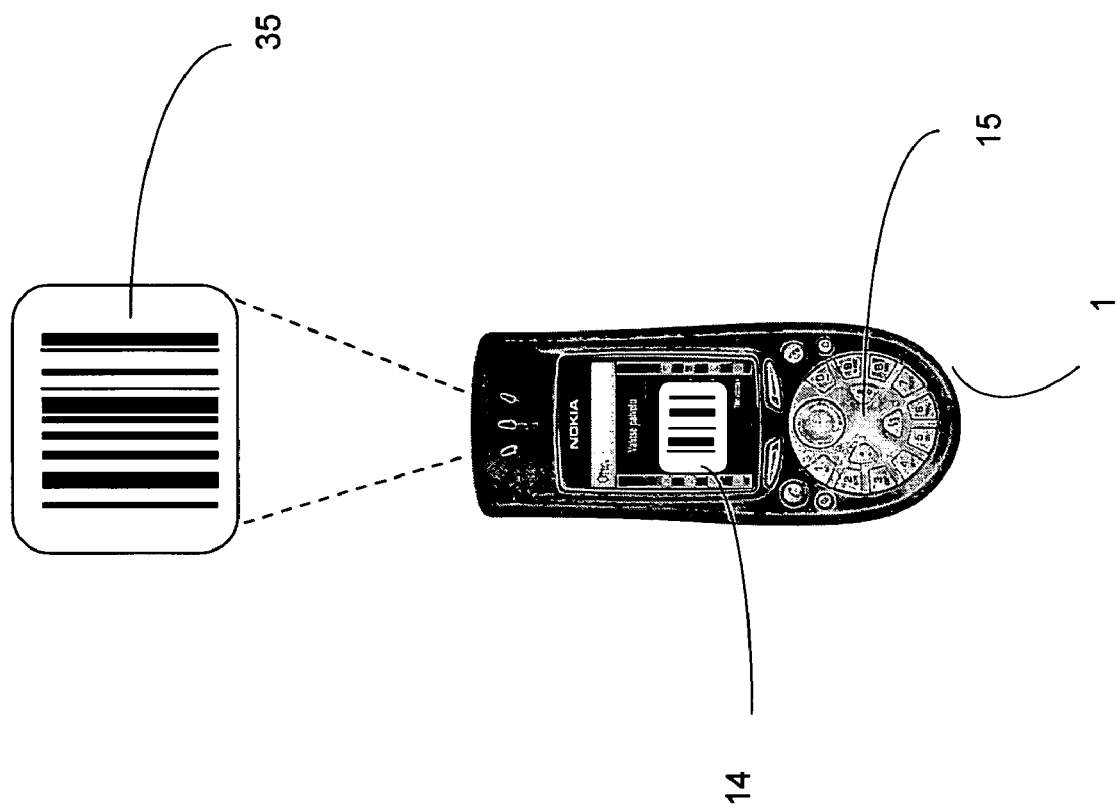
FIG. 15 illustrates the use of machine-readable data in accordance with an embodiment of the present invention.
Figure 16:
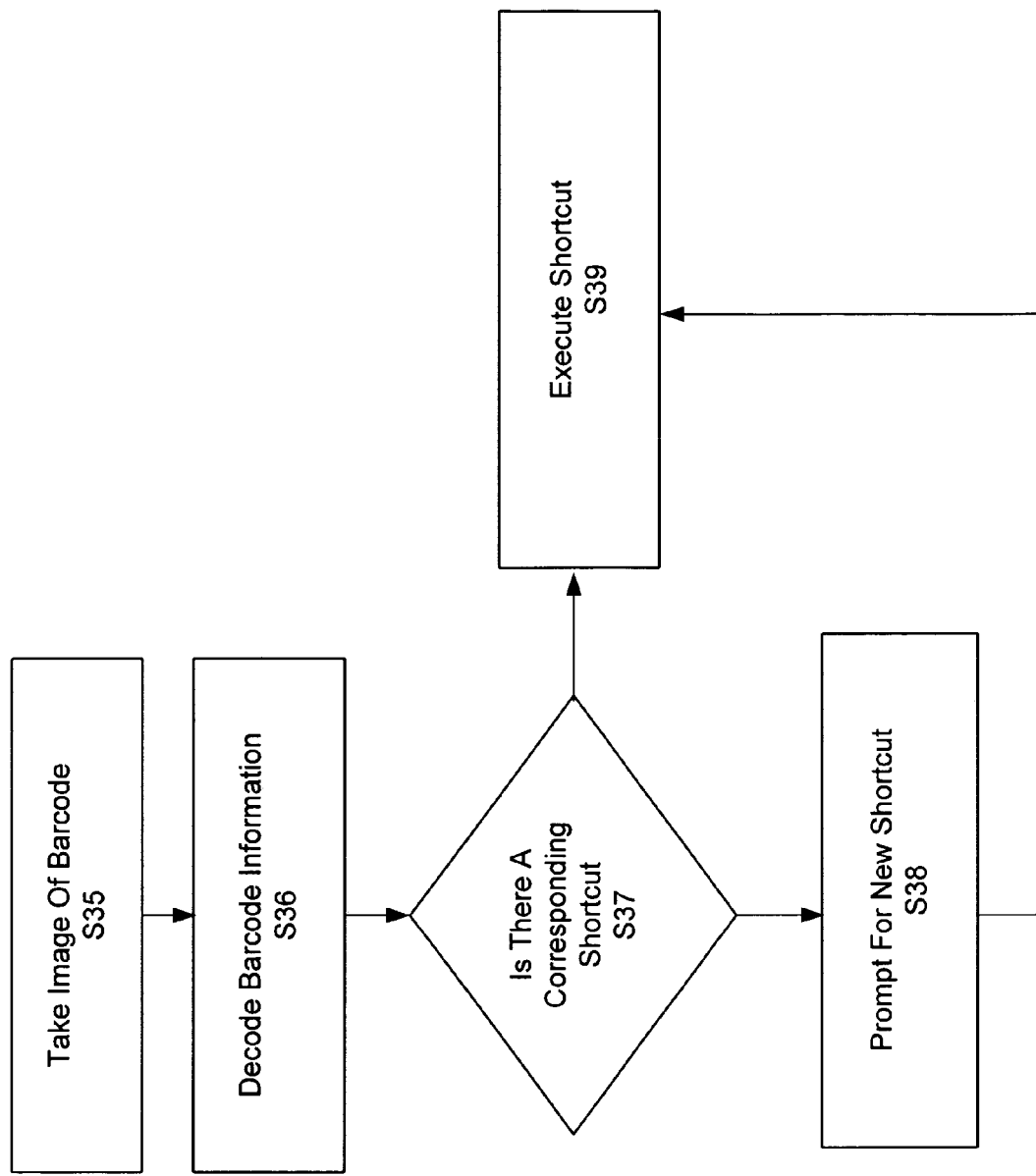
FIG. 16 illustrates a method of using machine-readable data for selecting and creating a shortcut in accordance with an embodiment of the present invention.

In another embodiment it is contemplated that the present invention as described above can be used in a barcode environment. For example, RFID tags can be replaced with a barcode tag, which can be used to "program" various functions of a personal communication device. Communication between the barcode and the personal communication device can be achieved, in addition to integrating the personal communication device with a conventional barcode reader, by the use of a camera in the device that takes a picture of the barcode. The barcode can then be decoded and processed by the personal communication device. FIGS. 15 and 16 illustrate the barcode environment as described above.

In FIG. 15, the user of the personal communication device 1 uses an interface 15 to take an image of a bar cod. The image is taken using an imaging device (not shown) such as a digital camera in the device 1. The barcode 35 is place on an item or at a location pertinent to a user or plurality of users. The image of the barcode is shown in the display 14 of the device 1.

FIG. 16, illustrates a method of selecting or creating a shortcut using machine-readable code such as barcode. In step S35, the imaging device in the personal communication device 1 either reads or takes an image of the barcode 35. In step S37, the processor of the personal communication device 1 decodes the barcode data and searches the memory 16 in the personal communication device 1. If no corresponding shortcut 19 is found in the memory 16, then in step S38 the user is prompted to select or create a new shortcut 19, which can be executed in step S39. On the other hand, in step S37 if a corresponding shortcut 19 is found, then in step S39, the stored shortcut is selected and executed. It should be noted that reprogramming a barcode 35 itself by "rewriting" is not contemplated, only the aspects of programming the device memory 16, and network location updates are contemplated by the present invention. It is also contemplated that the barcode aspect includes the use of optical codes or "2D barcodes" that can vary in color, shape and size.

In yet another embodiment it is contemplated that "local hot spots" can be implemented with the present invention as described above. For example, local hot spots transmit wireless shortcuts to proximate personal communication devices. The user of the device can then re-program the shortcuts in the device using any of the techniques herein.

Although illustrative embodiments have been described herein in detail, it should be noted and understood that the descriptions and drawings have been provided for purposes of illustration only and that other variations both in form and detail can be added thereupon without departing from the spirit and scope of the invention. The terms and expressions have been used as terms of description and not terms of limitation. There is no limitation to use the terms or expressions to exclude any equivalents of features shown and described or portions thereof.

We claim:

1. A method in a communication device, comprising:
   receiving and decoding RF tag information via a RF tag reader;
   scanning a memory location for a shortcut based on the received RF tag information; and
   providing an interface for selecting or creating a new shortcut to be stored in said memory location and executed based on the received RF tag information, wherein said new shortcut includes at least said RF tag information and a command associated with said RF tag information for selecting and executing an application program for effecting at least one personalized function in the communication device in response to the execution of said new shortcut in response to receiving the RF tag information via the RF tag reader.

2. The memory of claim 1, wherein said providing an interface includes initiating a command assigning the application program stored in the communication device for associating the selected or created new shortcut with said RF tag information in said memory location for enabling execution of a command macro or script in response to the execution of said shortcut.

3. The method of claim 2, wherein said RF tag is passive or active.

4. The method of claim 2, further comprising programming said RF tag with said new shortcuts.

5. The method of claim 4, wherein said memory is a secure memory that is write-protected.

6. The method of claim 1, wherein said memory location is a memory within an RF tag.

7. The method of claim 1, wherein said memory location is a memory within the communication device.

8. The method of claim 1, wherein said memory location is a memory within a network server accessible via a public communication network.

9. The method of claim 8, further comprising establishing a network connection to a public network for communication between said network server and another communication device.

10. The method of claim 9, wherein said network connection is a wireless network connection and uses a wireless communication protocol for transmitting data to and receiving data from said communication device.

11. The method of claim 9, wherein the new shortcut stored in the memory of said network server is available to other devices or users having access to said public network.

12. The method of claim 1, wherein RF tag information includes tag identification information.

13. The method of claim 1, wherein execution of the application program controls the at least one function of said communication device.

14. The method of claim 13, wherein said at least one function includes displaying data, making a phone call, sending a communication to another device, taking a photograph, connecting to a public network, modifying settings or tools or other similar functions performed by the communication device.

15. The method of claim 14, wherein said communication to another device includes sending a shortcut to another device by publishing the shortcut on the Internet.

16. The method of claim 1, further comprising transmitting RF information to a plurality of users each with a communication device, wherein said RF information executes a different function in each communication device.

17. The method of claim 1, wherein said RF tag is an RFID tag and said RF reader is an RFID reader.

18. The method of claim 1, wherein said scanning of said memory location is prioritized for more efficient use of network resources.

19. The method of claim 18, wherein said prioritization involves scanning an RF tag memory and/or scanning a communication device memory for a shortcut and before scanning a network server memory for a shortcut that corresponds to the RF tag information received by the communication device.

20. A method in a communication device, comprising:
   capturing machine-readable data using an imaging device in the communication device;
   decoding the machine-readable data;
   scanning a memory location for a shortcut based on said machine-readable data;
   providing an interface for selecting or creating a new shortcut to be stored in said memory location and executed based on the received machine-readable data,
   wherein said new shortcut includes at least machine-readable information and a command associated with said machine-readable information for selecting and executing an application program for effecting at least one personalized function in the communication device in response to the execution of said new shortcut in response to receiving the machine-readable data.

21. The method of claim 20, wherein said providing an interface includes initiating a command assigning the application program stored in the communication device for associating the selected or created new shortcut with said RF tag information in said memory location for enabling execution of a command macro or script in response to the execution of said shortcut.

22. The method of claim 20, wherein said machine-readable data is a barcode.

23. The method of claim 20, where said imaging device is a digital camera.

24. The method of claim 20, wherein said machine-readable data includes identification information.

25. A computer program product in a communication device, comprising:
   a computer readable medium for storing program code;
   program code for receiving and decoding RF tag information via a RF tag reader;
   program code for scanning a memory location for a shortcut based on the received RF tag information;
   program code for providing an interface for selecting or creating a new shortcut to be stored in said memory location and executed based on the received RF tag information, wherein said new shortcut includes at least said RF tag information and a command associated with said RF tag information for selecting an application program for effecting at least one personalized function in the communication device in response to the execution of said new shortcut in response to receiving the RF tag information via the RF tag reader.

26. The computer program product of claim 25, wherein said providing an interface includes initiating a command assigning the application program stored in the communication device for associating the selected or created new shortcut with said RF tag information in said memory location for enabling execution of a command macro or script in response to the execution of said shortcut.

27. The computer program product of claim 25, wherein said memory location is memory within an RF tag.

28. The computer program product of claim 27, wherein said memory in the RF tag is a secure memory that is write-protected.

29. The computer program product of claim 25, wherein said memory location is a memory within the communication device.

30. The computer program product of claim 25, wherein said memory location is a memory within a network server accessible via a public communications network.

31. The computer program product of claim 25, wherein said RF tag information includes RF tag identification information.

32. The computer program product of claim 25, further comprising program code for establishing a network connection to a public network for communication between a network server and the communication device.

33. The computer program product of claim 32, wherein said network connection uses a wireless network protocol for transmitting data to and receiving data from said communication device.

34. The computer program product of claim 25, further comprising program code for executing the application program based on a shortcut that controls the at least one function of said communication device.

35. The computer program product of claim 34, wherein application program is for displaying data, making a phone call, sending a communication to another device, taking a photograph, connecting to a public network, modifying settings or tools and other similar functions performed by the communication device.

36. The computer program product of claim 25, further comprising program code for communicating said shortcuts to another device by publishing said shortcuts on the Internet.

37. The computer program product of claim 25, further comprising program code for transmitting said RF information to a plurality of users for the execution of an application program in their respective communication devices, wherein each application is different.

38. The computer program product of claim 25, wherein said RF tag is an RFID tag and said RF reader is an RFID reader.

39. The computer program product of claim 25, wherein said scanning of said memory location is prioritized for more efficient use of network resources.

40. The computer program product of claim 39, wherein said prioritization involves scanning an RF tag memory, and/or scanning a communication device memory for a shortcut before scanning a network server memory for a shortcut that corresponds to the RF tag information received by the communication device.

41. A computer program product in a communication device, comprising:
a computer readable medium for storing program code;
program code for capturing machine-readable data using an imaging device in the communication device;
program code for decoding the machine-readable data;
program code for scanning a memory location for a shortcut based on said machine-readable data; and
program code for providing an interface for selecting or creating a new shortcut to be stored in said memory location and executed based on the machine-readable data,
wherein said new shortcut includes at least said machine-readable information and a command associated with said machine-readable information for selecting and executing an application program for effecting at least one personalized function in the communication device in response to the execution of said new shortcut in response to receiving the machine-readable data.

42. The computer program product of claim 41, wherein said providing an interface
includes initiating a command assigning the application program stored in the communication device for associating the selected or created new shortcut with said RF tag information in said memory location for enabling execution of a command macro or script in response to the execution of said shortcut.

43. The computer program product of claim 41, wherein said machine-readable data is a barcode.

44. The computer program product of claim 41, where said imaging device is a digital camera.

45. The computer program product of claim 41, wherein said machine-readable data includes identification information.

46. A system in a communication device, comprising:
an RF tag reader within a communication device for receiving and decoding an RF signal;
at least one RF tag placed in a specific location and sending at least RF tag information to said RF reader;
a memory location for storing at least one shortcut; and
a processor in said communication device for scanning the memory location for a shortcut and prompting the selection or creation of a new shortcut to be executed based on said RF tag information, wherein said new shortcut includes at least said RF tag information and a command associated with said RF tag information for selecting and executing an application program for effecting at least one personalized function in the communication device in response to the execution of said new shortcut in response to receiving the RF tag information via the RF tag reader.

47. The system of claim 46, further comprising a user interface used to initiate a command for assigning the application program stored in the communication device for associating the selected or created new shortcut with said RF tag information in said memory location for enabling execution of a command macro or script in response to the execution of said shortcut.

48. The system of claim 46, wherein said at least one shortcut includes a preset shortcut or a newly created shortcut.

49. The system of claim 46, wherein said memory location for storing said at least one shortcut includes memory within the RF tag.

50. The system of claim 49, wherein said RF tag has a programmable memory that is write-protected.

51. The system of claim 46, wherein said memory location is a memory within the communication device.

52. The system of claim 46, wherein said memory location is a memory within a network server accessible via a public communications network.

53. The system of claim 46, wherein said RF tag information includes tag identification information.

54. The system of claim 46, wherein said RF tag is passive or active.

55. The system of claim 46, further comprising a network connection for communication between a network server and the communication device.

56. The system of claim 55, wherein said network connection is a wireless connection using a protocol for transmitting data to and receiving data from said communication device.

57. The system of claim 46, wherein said RF tag is an RFID tag and said RF reader is an RFID reader.

58. The system of claim 46, wherein said scanning of said memory location is prioritized for more efficient use of network resources.

59. The system of claim 58, wherein said prioritization involves scanning an RF tag memory and/or scanning a communication device memory for a shortcut before scanning a network server memory for a shortcut that corresponds to the RF tag information received by the communication device.

60. A system in a communication device, comprising:
machine-readable data placed in a specific location;
an imaging device within a communication device for capturing the machine-readable data;
a memory location for storing at least one shortcut; and
a processor for decoding the machine-readable data and scanning for a shortcut as well as prompting the selection or creation of a new shortcut to be executed based on said machine-readable data,
wherein said new shortcut includes at least said machine-readable information and a command associated with said machine-readable information for selecting and executing an application program for effecting at least one personalized function in the communication device in response to the execution of said new shortcut in response to receiving the machine-readable data.

61. The system of claim 60, further comprising a user interface used to initiate a command for assigning the application program stored in the communication device for associating the selected or created new shortcut with said RF tag information in said memory location for enabling execution of a command macro or script in response to the execution of said shortcut.

62. The system of claim 60, wherein said machine-readable data is a barcode.

63. The system of claim 60, where said imaging device is a digital camera.

64. The system of claim 60, wherein said machine-readable data includes identification information.

65. An apparatus, comprising:
   an RF tag reader for receiving and decoding RF tag information from at least one RF tag;
   a memory location for storing at least one shortcut; and
   a processor for scanning a memory location for a shortcut and prompting the selection or creation of a new shortcut based on the receipt of said RF tag information,
   wherein said new shortcut includes at least said RF tag information and a command associated with said RF tag information for selecting and executing an application program for effecting at least one personalized function in the communication device in response to the execution of said new shortcut in response to receiving the RF tag information via the RF tag reader.

66. The apparatus of claim 65, further comprising a user interface used to initiate a command for assigning the application program stored in the communication device for associating the selected or created new shortcut with said RF tag information in said memory location for enabling execution of a command macro or script in response to the execution of said shortcut.

67. The apparatus of claim 65, wherein said at least one shortcut includes said preset shortcut and newly created shortcut.

68. The apparatus of claim 65, wherein said memory location for storing said at least one shortcut includes memory within the communication device.

69. The apparatus of claim 65, wherein said RF tag information includes at least tag identification information and a command.

70. The apparatus of claim 65, wherein said RF tag is an RFID tag and said RF reader is an RFID reader.

71. The apparatus of claim 65, wherein said scanning of said memory location is prioritized for more efficient use of network resources.

72. The apparatus of claim 65, wherein said prioritization involves scanning an RF tag memory and/or scanning a communication device memory before scanning a network server memory for a shortcut that corresponds to the RF tag information received by the communication device.

73. An apparatus, comprising:
   an imaging device for capturing machine-readable data;
   a memory location for storing at least one shortcut; and
   a processor for decoding said machine-readable data and scanning for a shortcut as well as prompting for the selection or creation of a new shortcut based on the machine-readable data, wherein said new shortcut includes at least machine-readable information and a command associated with said machine-readable information for selecting an application program for effecting at least one personalized function in the communication device in response to the execution of said shortcut in response to receiving the machine-readable data.

74. The apparatus of claim 73, further comprising a user interface used to initiate a command for assigning the application program stored in the communication device for associating the selected or created new shortcut with said RF tag information in said memory location for enabling execution of a command macro or script in response to the execution of said shortcut.

75. The apparatus of claim 73, wherein said machine-readable data is barcode.

76. The apparatus of claim 73, where said imaging device is a digital camera.

77. The apparatus of claim 73, wherein said machine-readable data includes identification information.

\* \* \* \* \*

UNITED STATES PATENT AND TRADEMARK OFFICE
CERTIFICATE OF CORRECTION

PATENT NO. : 7,407,107 B2  Page 1 of 1
APPLICATION NO. : 10/728915
DATED : August 5, 2008
INVENTOR(S) : Engestrom et al.

It is certified that error appears in the above-identified patent and that said Letters Patent is hereby corrected as shown below:

Column 13

In Claim 4, line 2, "shortcuts" should be --shortcut--.

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,407,107 B2 | Page 1 of 1 |
| APPLICATION NO. | : 10/728915 | |
| DATED | : August 5, 2008 | |
| INVENTOR(S) | : Engestrom et al. | |

It is certified that error appears in the above-identified patent and that said Letters Patent is hereby corrected as shown below:

<u>Column 13</u>

In Claim 4, line 4, "shortcuts" should be --shortcut--.

This certificate supersedes the Certificate of Correction issued November 4, 2008.

Signed and Sealed this

Twenty-fifth Day of November, 2008

JON W. DUDAS
*Director of the United States Patent and Trademark Office*